United States Patent
Byeon et al.

(10) Patent No.: US 12,520,846 B2
(45) Date of Patent: Jan. 13, 2026

(54) NANOCOMPOSITE PREPARATION APPARATUS

(71) Applicants: Research Cooperation Foundation of Yeungnam University, Gyeongsangbuk-do (KR); University-Industry Foundation, Yonsei University, Seoul (KR)

(72) Inventors: Jeong Hoon Byeon, Gyeongsangbuk-do (KR); Jung Ho Hwang, Seoul (KR); Dae Hoon Park, Seoul (KR); Sung Jae Park, Seoul (KR)

(73) Assignee: Research Cooperation Foundation of Yeungnam University, Gyeongsan-Si (KR)

( * ) Notice: Subject to any disclaimer, the term of this patent is extended or adjusted under 35 U.S.C. 154(b) by 1291 days.

(21) Appl. No.: 17/269,976

(22) PCT Filed: Aug. 22, 2019

(86) PCT No.: PCT/KR2019/010691
§ 371 (c)(1),
(2) Date: Feb. 19, 2021

(87) PCT Pub. No.: WO2020/040565
PCT Pub. Date: Feb. 27, 2020

(65) Prior Publication Data
US 2021/0321619 A1    Oct. 21, 2021

(30) Foreign Application Priority Data

Aug. 22, 2018  (KR) .................... 10-2018-0098169

(51) Int. Cl.
 *A01N 59/20*    (2006.01)
 *A01N 25/34*    (2006.01)
 (Continued)

(52) U.S. Cl.
 CPC ............. *A01N 59/20* (2013.01); *A01N 25/34* (2013.01); *C01G 3/00* (2013.01); *C01G 5/00* (2013.01);
 (Continued)

(58) Field of Classification Search
 CPC .......... A01N 59/20; A01N 25/34; C01G 3/00; C01G 5/00; B82Y 5/00; B82Y 30/00;
 (Continued)

(56) References Cited

U.S. PATENT DOCUMENTS

| | | | | |
|---|---|---|---|---|
| 5,062,936 A | * | 11/1991 | Beaty | ....................... B22F 9/14 423/594.19 |
| 2010/0038251 A1 | | 2/2010 | Kim et al. | |
| 2018/0236579 A1 | * | 8/2018 | Luo | .................... H03K 19/0944 |

FOREIGN PATENT DOCUMENTS

| | | |
|---|---|---|
| KR | 10-0860589 B1 | 9/2008 |
| KR | 10-2010-0021333 A | 2/2010 |

(Continued)

*Primary Examiner* — Xiuyu Tai
(74) *Attorney, Agent, or Firm* — Myers Bigel, P.A.

(57) ABSTRACT

The present application relates to a nanocomposite preparation apparatus and a nanocomposite prepared using same, and a nanocomposite preparation apparatus of the present application can prepare a nanocomposite having excellent stability by reducing toxicity while maintaining antibacterial properties of conventional antibacterial metals.

5 Claims, 15 Drawing Sheets

(51) Int. Cl.
*C01G 3/00* (2006.01)
*C01G 5/00* (2006.01)
*B82Y 5/00* (2011.01)
*B82Y 30/00* (2011.01)
*B82Y 35/00* (2011.01)

(52) U.S. Cl.
CPC ............... *B82Y 5/00* (2013.01); *B82Y 30/00* (2013.01); *B82Y 35/00* (2013.01); *C01P 2004/03* (2013.01); *C01P 2004/04* (2013.01); *C01P 2004/64* (2013.01); *C01P 2006/60* (2013.01)

(58) Field of Classification Search
CPC ..... B82Y 35/00; B82Y 40/00; C01P 2004/03; C01P 2004/04; C01P 2004/64; C01P 2006/60; C25C 1/20; C25C 1/22; B01J 19/088; B01J 2219/0809; B01J 2219/0894; B01J 2219/0841; B01J 2219/0877; B01J 2219/0828; B01J 2219/083; H05H 1/47; H05H 2245/36; B22F 9/20; B22F 2999/00; B22F 2202/06; B22F 2202/13

See application file for complete search history.

(56) References Cited

FOREIGN PATENT DOCUMENTS

| | | |
|---|---|---|
| KR | 10-1241086 B1 | 3/2013 |
| KR | 10-1415148 B1 | 8/2014 |
| KR | 10-2017-0079578 A | 7/2017 |

* cited by examiner

[Figure 1]
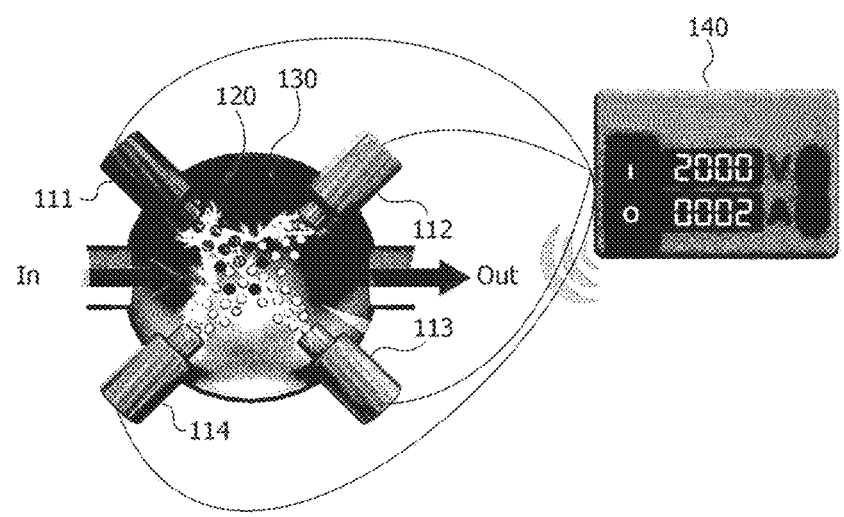
[Figure 2]
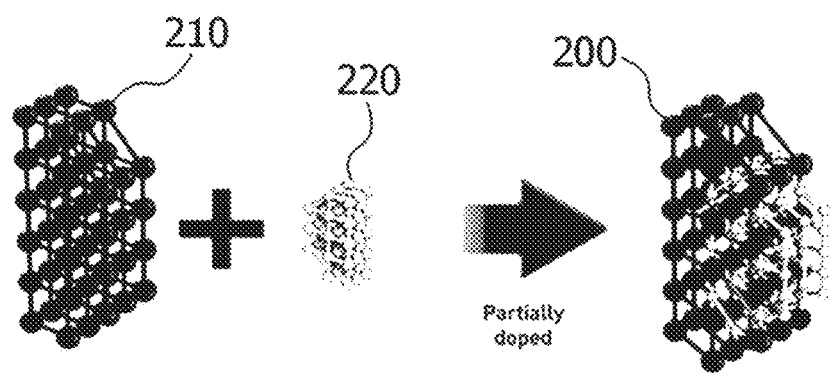

[Figure 3]
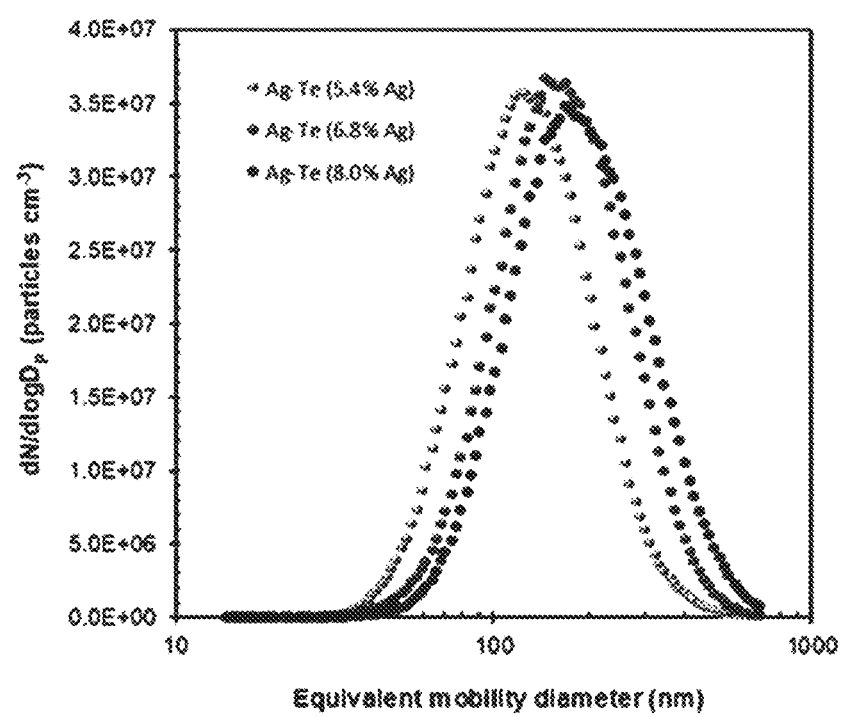

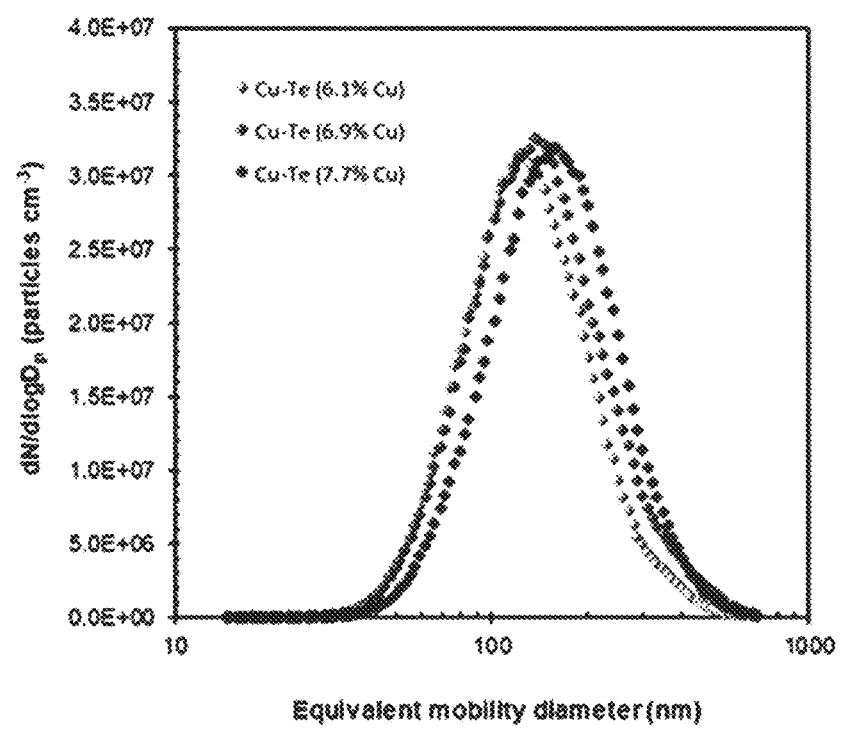
[Figure 4]

[Figure 5]
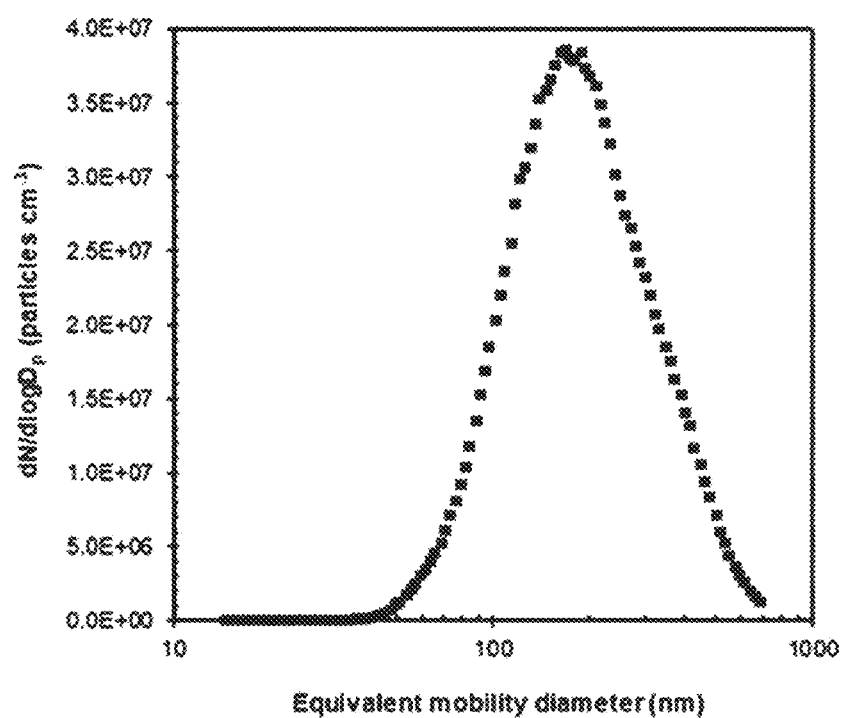

[Figure 6]
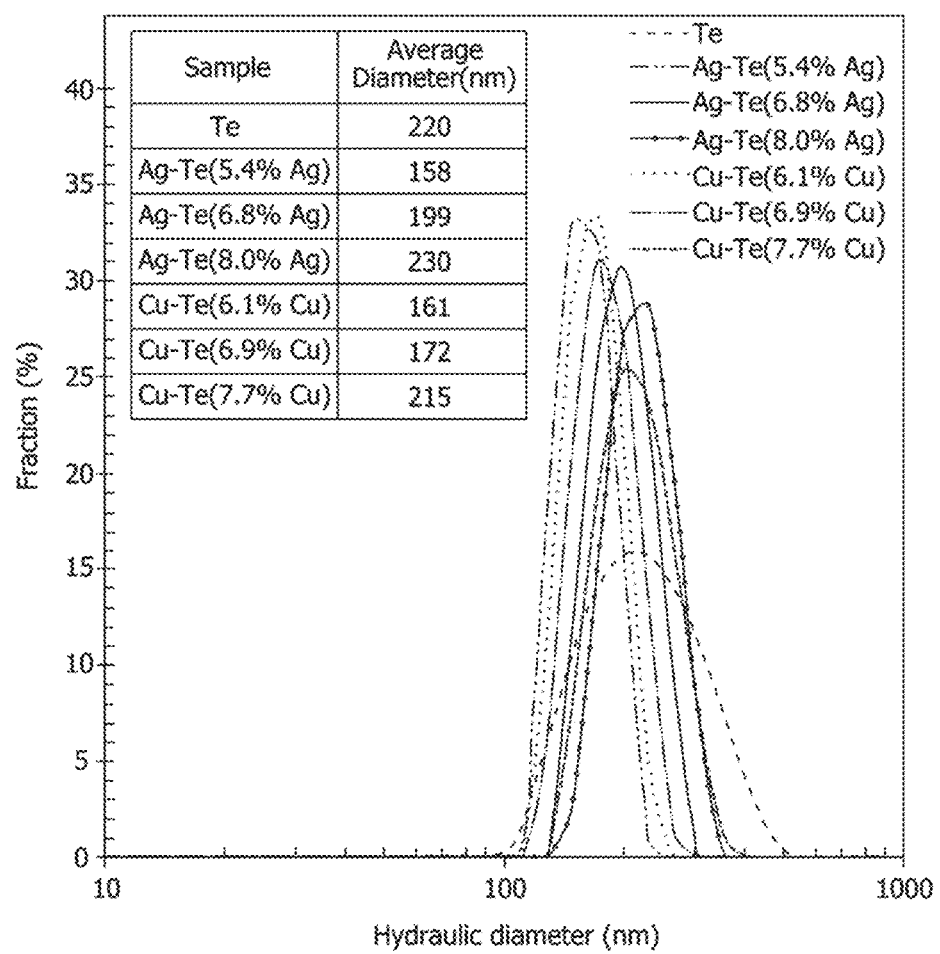

[Figure 7]
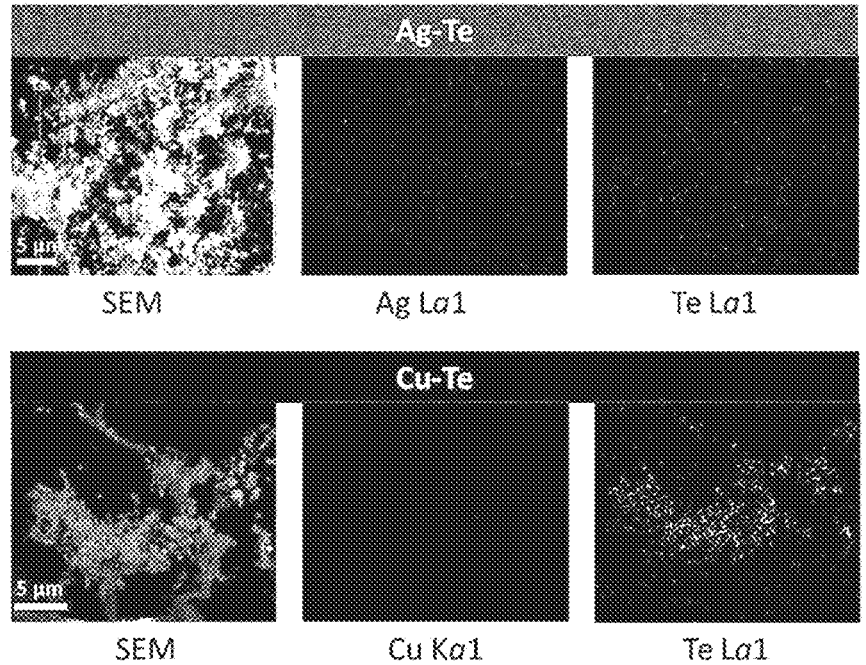
[Figure 8]
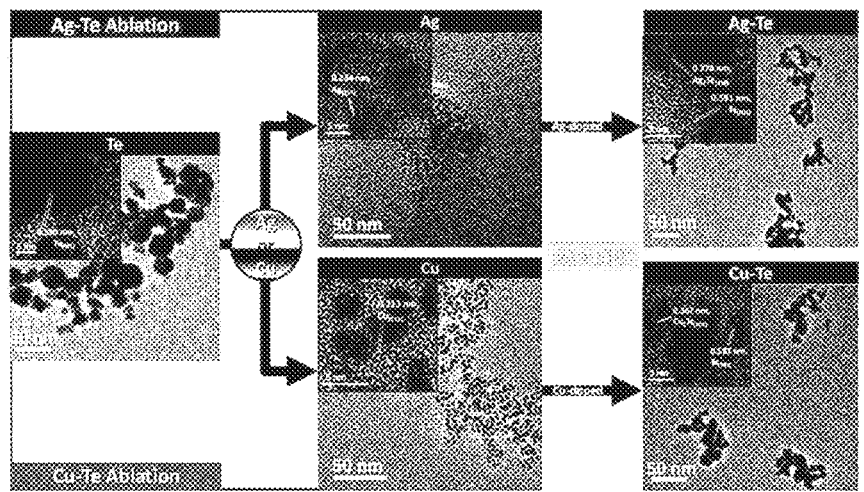

[Figure 9]
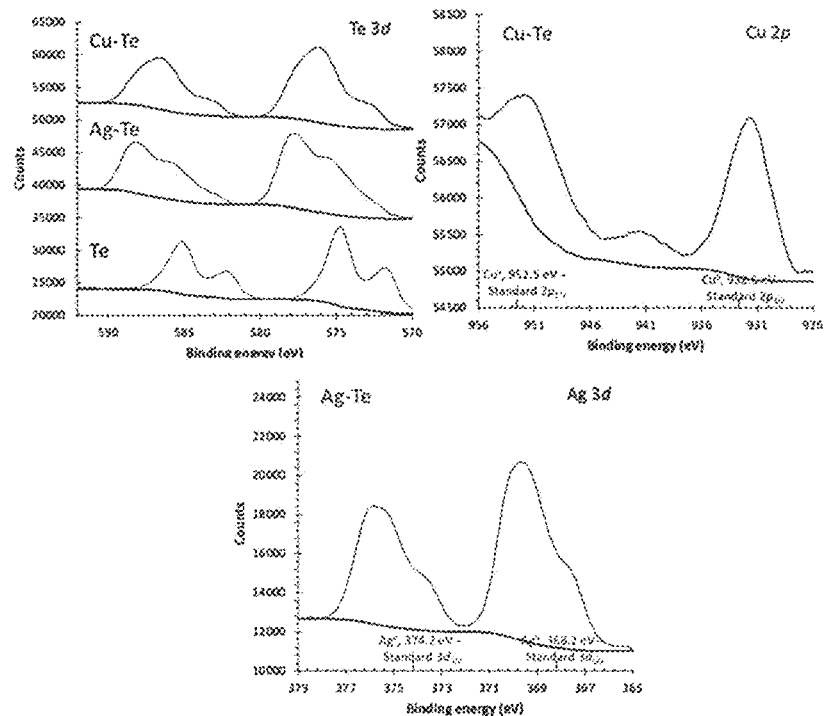
[Figure 10]
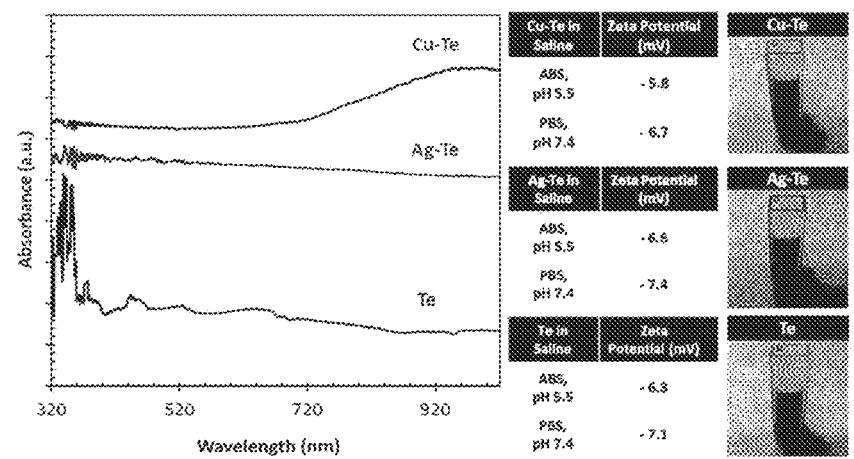

[Figure 11]
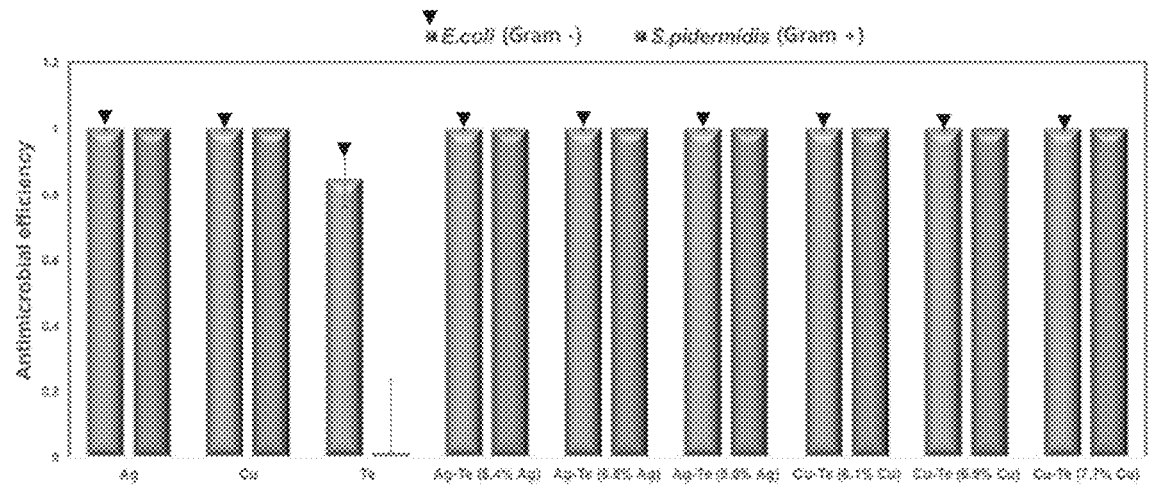
[Figure 12]
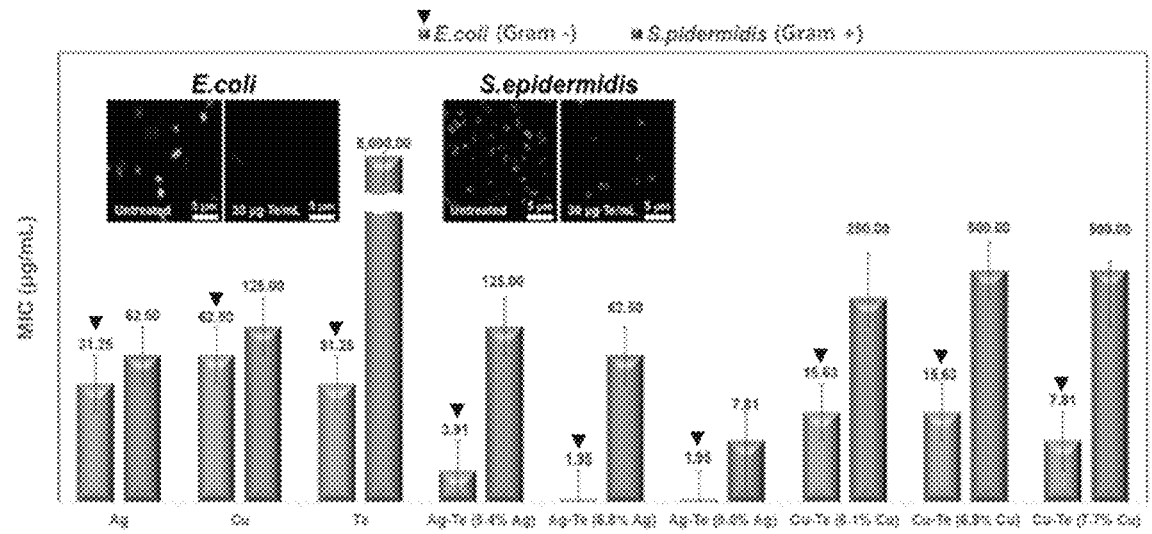

[Figure 13]
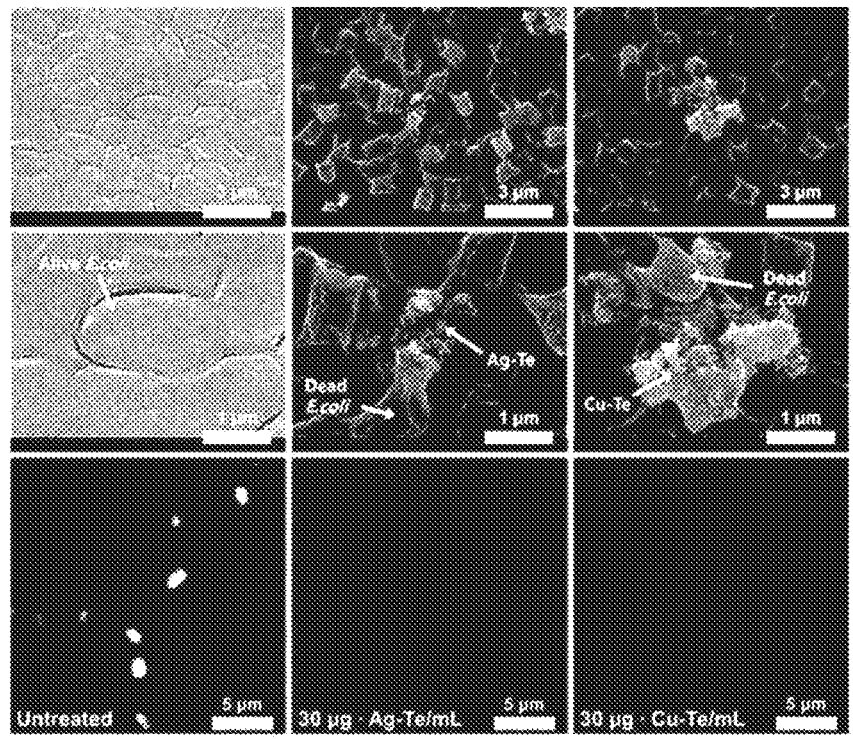
[Figure 14]
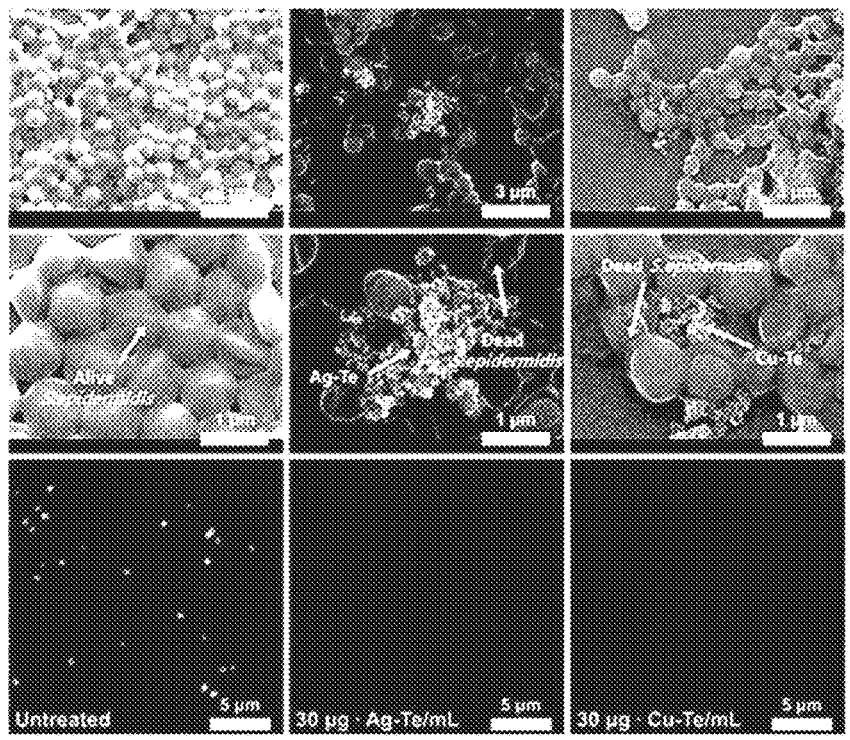

[Figure 15]
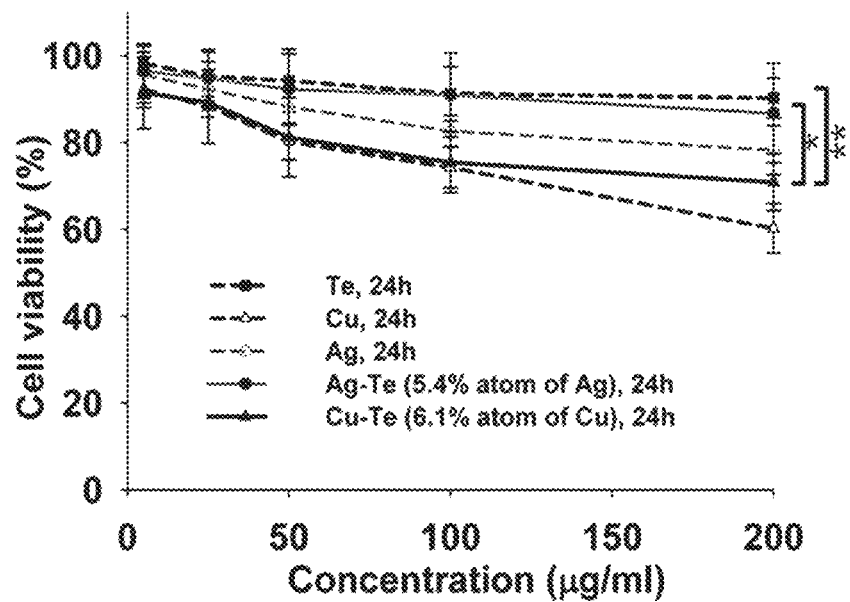
[Figure 16]
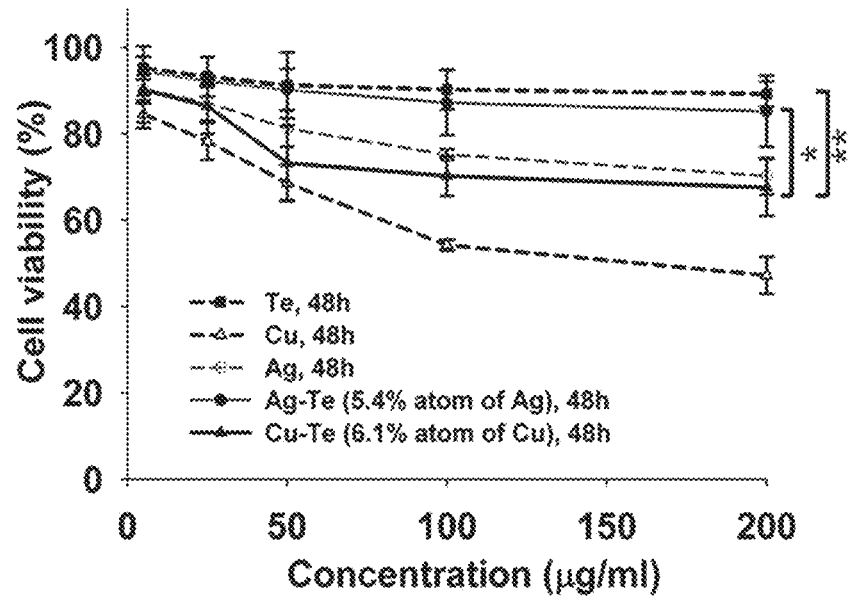

[Figure 17]
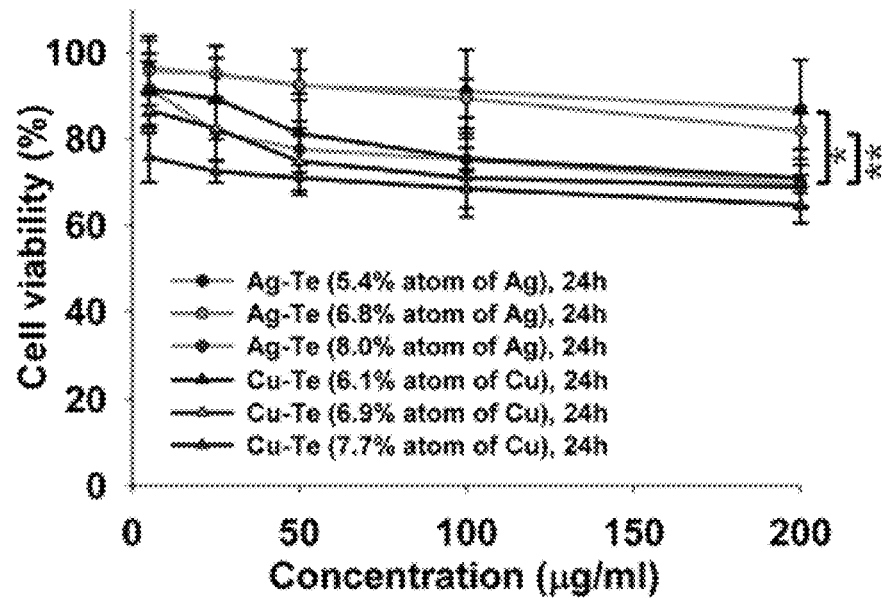
[Figure 18]
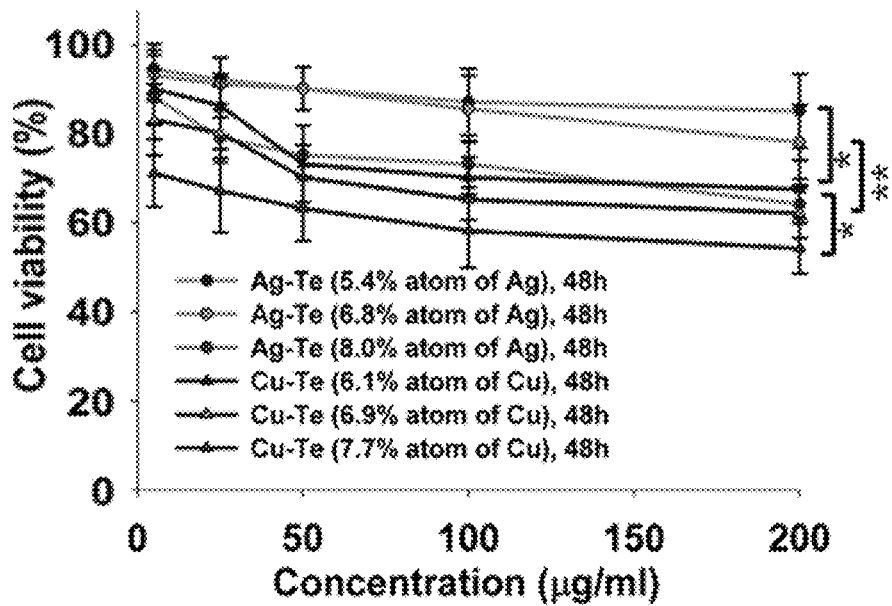

[Figure 19]
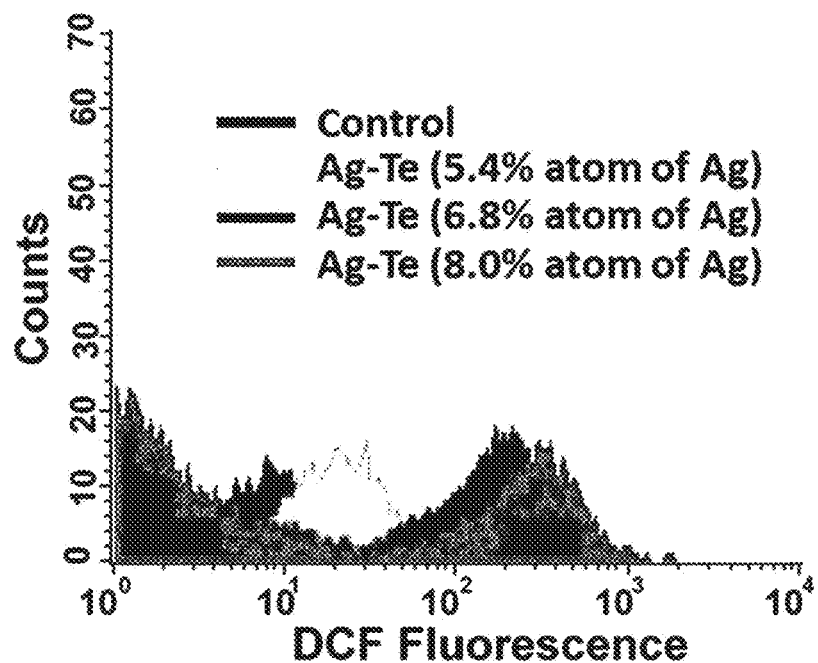
[Figure 20]
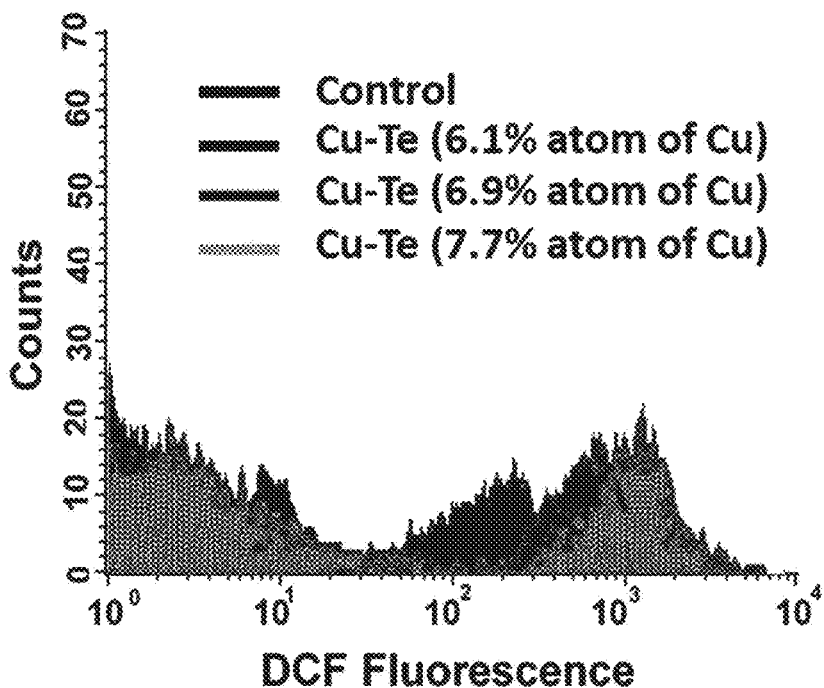

[Figure 21]
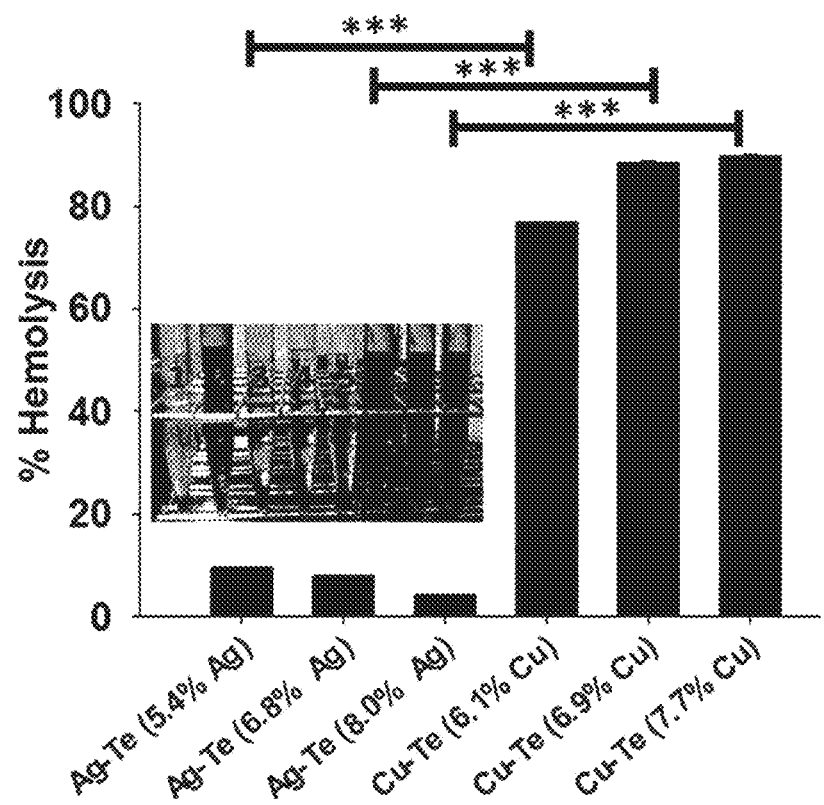

[Figure 22]
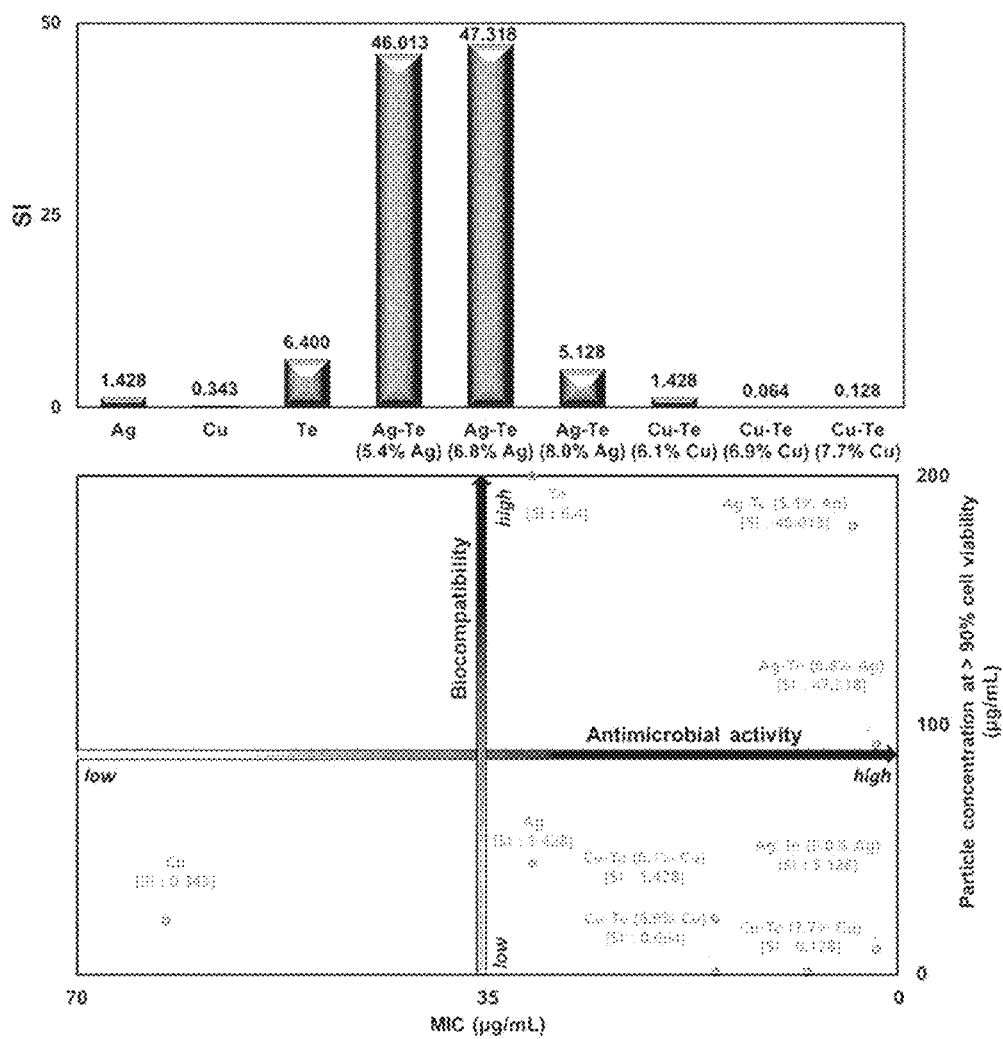

[Figure 23]
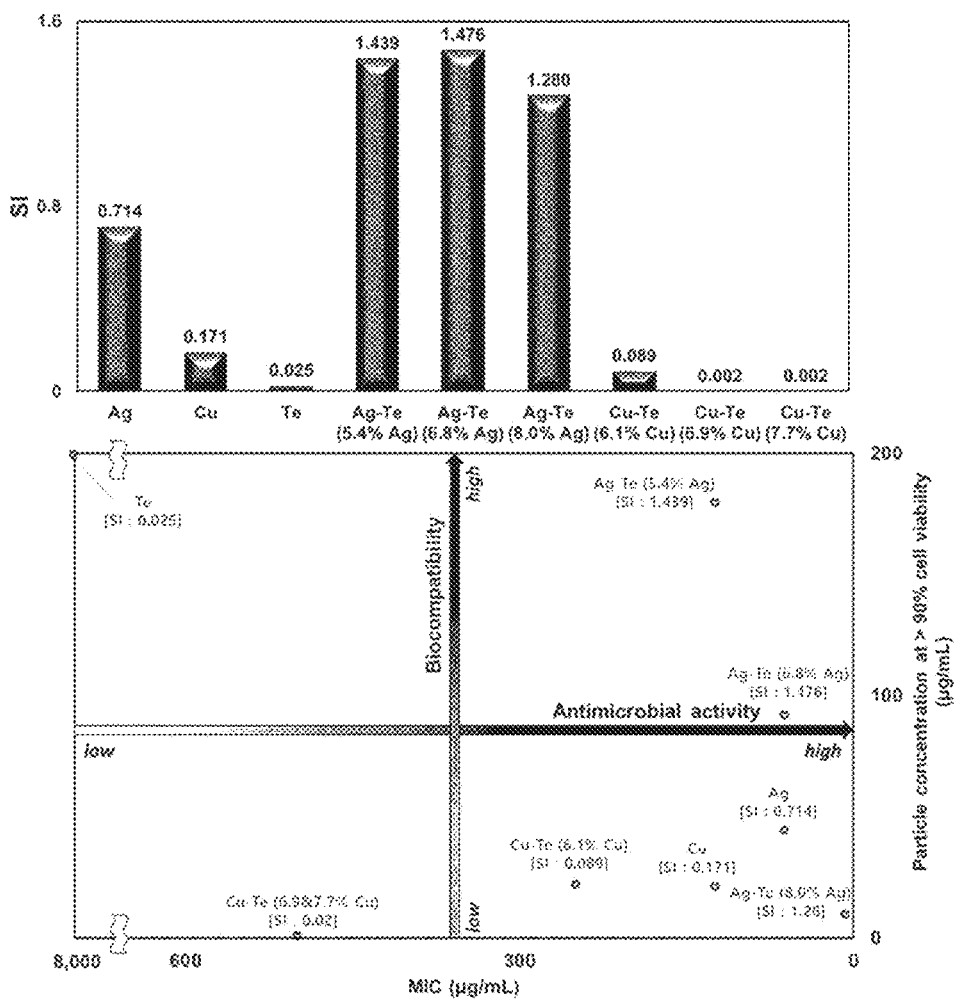

NANOCOMPOSITE PREPARATION APPARATUS

TECHNICAL FIELD

The present application relates to a nanocomposite preparation apparatus and a nanocomposite prepared using same.

BACKGROUND ART

Antibacterial compounds are used in numerous hygiene and health care application fields, including products that prevent biological risks such as pathogen bacterial infection. Currently, 70% or more of bacterial infections are resistant to commonly used antibiotics such as tetracycline and ampicillin, and highly active antibacterial agents have been developed to replace them. Metal nanoparticles and nanocomposites are expected as antibacterial agents. In particular, dissolution of metal particles and release of metal ions improve the efficacy as the antibiotics even in multiresistant bacteria. Among the metal nanoparticles, silver (Ag) and copper (Cu) nanoparticles are the most characterized antibacterial agents, which can be widely used in cosmetics, sprays, fibers, deodorants and infection prevention. Antibacterial activity of Ag and Cu particles against Gram-positive and Gram-negative bacterial strains is associated with the dissolution of ions that promote electrostatic interactions with negatively charged bacterial membranes. In addition, the antibacterial activity of Ag and Cu particles against Gram-positive and Gram-negative bacterial strains impairs proteins and membranes, and induces oxidative stress, thereby causing damage.

Recently, important toxic side effects of Ag and Cu nanoparticles have become a concern for humans and the environment, which have been associated with cellular uptake and lysosome infiltration to create reactive oxygen species (ROS) impairing DNA. As a result of these observations, the selection of antibiotics became complicated, and these observations prioritized the balance of antibacterial function and bio-environmental safety. There is also a need to address the health and environmental hazards of material processes, while ensuring access by safety design prioritizing the balance between material function and toxicity. Generally, safety-designed nanoparticles have been made by coating a high-molecular compound such as polyethylene glycol and chitosan chelate on their surfaces. However, the hydrolysis and intrinsic toxicity of these formulations have limited safety and practicality.

More recently, surface modification has been investigated to reduce the toxicity of nanoparticles without significant loss of function, and inert surfaces capable of being in direct contact with biological systems have been created. In particular, the metal doping effect of the basic materials on the dissolution kinetics of the metal nanoparticles has been used to reduce the toxic effect of the nanoparticles. However, few studies have verified the desired function and biotoxicity of metal nanoparticles. Therefore, the practical approach by safety design is currently limited to basic studies of dopants, Fe, Al, Ti, and S, and development of these technologies is required.

DISCLOSURE

Technical Problem

The present application relates to a nanocomposite preparation apparatus having excellent stability by reducing toxicity while maintaining antibacterial properties of conventional antibacterial metals, and a nanocomposite prepared using same.

Technical Solution

The present application relates to a nanocomposite. According to the exemplary nanocomposite preparation apparatus of the present application, it is possible by using an aerosol doping technology to prepare a nanocomposite having excellent stability by reducing toxicity while maintaining antibacterial properties of conventional antibacterial metals.

In this specification, the "spark discharge" means a high-frequency discharge method performed in a kV-mA mode at normal pressure. Also, in this specification, the "nano" may mean a size in a nanometer (nm) unit, which may mean, for example, a size of 1 to 1,000 nm, but is not limited thereto. Furthermore, in this specification, the "nanoparticles" may mean particles having a geometric mean diameter in a nanometer (nm) unit, which may mean, for example, particles having a geometric mean diameter of 1 to 1,000 nm, but is not limited thereto.

Hereinafter, a nanocomposite preparation apparatus of the present application will be described with reference to the accompanying drawings, and the accompanying drawings are illustrative, where the nanocomposite preparation apparatus of the present application is not limited to the accompanying drawings.

FIG. 1 illustratively shows a nanocomposite preparation apparatus according to one example of the present application. As shown in FIG. 1, the nanocomposite preparation apparatus comprises an electrode part, a discharge part (120) and a channel part (130).

The electrode part comprises a first electrode (111) made of tellurium and a plurality of second electrodes made of tellurium or an antibacterial metal. In this specification, the "plurality" means a number of two or more, and the upper limit is not limited. In this specification, the "antibacterial metal" means a metal having a property of inhibiting or killing growth of bacteria.

In one example, the plurality of second electrodes may be composed of 2 to 8. Specifically, the plurality of second electrodes may be 2 to 7, 2 to 6, 2 to 5, or 2 to 4. For example, when the plurality of second electrodes is composed of 2 to 8, the plurality of second electrodes may be a 2-1 electrode, a 2-2 electrode, a 2-3 electrode, a 2-4 electrode, a 2-5 electrode, a 2-6 electrode, a 2-7 electrode and a 2-8 electrode. Also, when the second electrode is composed of 2 to 7, the plurality of second electrodes may be a 2-1 electrode, a 2-2 electrode, a 2-3 electrode, a 2-4 electrode, a 2-5 electrode, a 2-6 electrode and a 2-7 electrode. Furthermore, when the second electrode is composed of 2 to 6, the plurality of second electrodes may be a 2-1 electrode, a 2-2 electrode, a 2-3 electrode, a 2-4 electrode, a 2-5 electrode and a 2-6 electrode. In addition, when the second electrode is composed of 2 to 5, the plurality of second electrodes may be a 2-1 electrode, a 2-2 electrode, a 2-3 electrode, a 2-4 electrode and a 2-5 electrode. In addition, when the second electrode is composed of 2 to 4, the plurality of second electrodes may be a 2-1 electrode, a 2-2 electrode, a 2-3 electrode and a 2-4 electrode. In addition, when the second electrode is composed of 2 to 3, the plurality of second electrodes may be a 2-1 electrode, a 2-2 electrode and a 2-3 electrode.

In one embodiment, the plurality of second electrodes may be 3, which may be, specifically, the 2-1 electrode (112), the 2-2 electrode (113) and the 2-3 electrode (114).

The discharge part (120) is a part that generates nanoparticles from the first electrode (111) and the plurality of second electrodes. In one example, the discharge part (120) may generate nanoparticles by spark discharge.

The first electrode (111) and the plurality of second electrodes are spaced apart from each other at a predetermined interval and disposed to form a gap. In this specification, the "gap" means a chink between objects facing each other in the longitudinal direction of the objects. For example, the gap means a chink between the electrodes facing each other in the longitudinal direction among the first electrode (111) and the plurality of second electrodes that are spaced apart from each other and disposed. In one example, the gap may mean a chink between the first electrode (111) and the 2-2 electrode (113), or the 2-1 electrode (112) and the 2-3 electrode (114), as shown in FIG. 1.

In one example, as for the gap between the first electrode (111) and the plurality of second electrodes, that is, the electrode gap, which is the shortest span between the facing electrodes, the smaller the span, the lower the voltage required for ignition, but as the span increases, a higher voltage is required. In addition, if the distance between the electrodes is narrow, the voltage required to generate sparks decreases, but short sparks may transfer minimum ignition energy to a mixer, causing a misfire, so that it is necessary to set an appropriate span by experiments. In one example, the gap between the electrodes may be 0.1 to 10 mm.

A minimum distance between adjacent electrodes among the first electrode (111) and the plurality of second electrodes may be 0.1 mm to 10.0 mm. Specifically, the minimum distance between adjacent electrodes among the first electrode (111) and the plurality of second electrodes may be 0.3 mm to 7 mm, 0.5 mm to 5 mm, 0.7 mm to 3 mm, or 0.9 mm to 1.5 mm. As shown in FIG. 1, the minimum distance ($d_{min}$) between adjacent electrodes may mean a distance representing a minimum value upon measuring the distance between two electrodes located closest to each other. In one example, the minimum distance ($d_{min}$) between adjacent electrodes may mean the minimum distance between the first electrode (111) and the 2-1 electrode (112), the minimum distance between the 2-1 electrode (112) and the 2-2 electrode (113), the minimum distance between the 2-2 electrode (113) and the 2-3 electrode (114), or the minimum distance between the 2-3 electrode (114) and the first electrode (111), as shown in FIG. 1. As the minimum distance ($d_{min}$) between adjacent electrodes among the first electrode (111) and the plurality of second electrodes satisfies the above-described range, stability during discharge between the electrodes can be secured.

One or more of the plurality of second electrodes may be made of an antibacterial metal. For example, two or more of the plurality of second electrodes may be made of an antibacterial metal, three or more of the plurality of second electrodes may be made of an antibacterial metal, four or more of the plurality of second electrodes may be made of an antibacterial metal, five or more of the plurality of second electrodes may be made of an antibacterial metal, six or more of the plurality of second electrodes may be made of an antibacterial metal, and seven or more of the plurality of second electrodes may be made of an antibacterial metal. Also, all of the plurality of second electrodes may be made of an antibacterial metal. In one example, the 2-1 electrode (112), the 2-2 electrode (113) and the 2-3 electrode (114) may all be made of an antibacterial metal. Furthermore, the 2-1 electrode (112) and the 2-2 electrode (113), the 2-1 electrode (112) and the 2-3 electrode (114), or the 2-2 electrode (113) and the 2-3 electrode (114) may be made of an antibacterial metal. In addition, the 2-1 electrode (112), the 2-2 electrode (113) or the 2-3 electrode (114) may be formed of an antibacterial metal. As the electrodes in the above-described range among the plurality of second electrodes are made of an antibacterial metal, a desired amount of antibacterial metal nanoparticles may be generated during spark discharge. At this time, among the plurality of second electrodes, the electrodes not made of an antibacterial metal may be made of tellurium. Specifically, in order to have a desired content ratio, it is preferred that the number of the second electrodes made of tellurium is 6 or less.

As long as the antibacterial metal is a metal capable of antibacterial action, the type is not limited thereto, and for example, silver, copper, gold, magnesium, zinc or titanium may be used.

The nanocomposite preparation apparatus may further comprise a power supply part (140). The power supply part (140) is a part for supplying voltage to each of the first electrode (111) and the plurality of second electrodes. The power supply part (140) may be electrically connected to each of the first electrode (111) and the plurality of second electrodes.

In one example, the power supply part (140) may apply a power source to each of the first electrode (Ill) and the plurality of second electrodes. For example, the power supply part (140) may apply a signal by connecting an alternating-current power source or a direct-current power source to each of the first electrode (111) and the plurality of second electrodes. Accordingly, by controlling the crystallinity of the particles more variously, it is possible to secure safety that varies depending on the crystallinity of the particles.

In one example, the power source controlled by the power supply part (140) may be an alternating-current power source, the voltage of the alternating-current power source may be 0.5 kV to 20 kV, and the frequency may be 0.2 kHz to 20 kHz. Specifically, the voltage of the alternating-current power source may be 1 kV to 10 kV, 1.5 kV to 5 kV, or 1.8 kV to 3 kV. In addition, the frequency of the alternating-current power source may be 1 kHz to 10 kHz, 1.5 kHz to 5 kHz, or 2 kHz to 3 kHz. By controlling the voltage and frequency of the alternating-current power source applied to each of the first electrode (111) and the plurality of second electrodes in the above-described range, it is possible to maintain the diameter of the particles generated from the first electrode (111) and the plurality of second electrodes in a nanometer unit and to simultaneously generate the tellurium nanoparticles and the antibacterial metal nanoparticles in the desired ratio during the spark discharge, even if inorganic particles are prepared using spark discharge rather than an arc discharge method.

Although not shown, the preparation apparatus of the present application may comprise a gas supply device such as a carrier gas supply system and a flowmeter such as an MFC (mass flow controller). In addition, nitrogen or an inert gas may be quantitatively supplied to the gap between the first electrode (111) and the plurality of second electrodes by the gas supply device and the flowmeter.

The nanoparticles may be generated under a flow of nitrogen or an inert gas. For example, the inert gas may be helium, neon or argon.

In addition, the nitrogen or inert gas may have a flow of 0.1 L/min or more, 0.5 L/min, 1 L/min or more, or 1.5 L/min or more. Furthermore, the upper limit of the flow of nitrogen or an inert gas may be 5 L/min or less, 4 L/min or less, 3 L/min or less, or 2 L/min or less. By controlling the flow of nitrogen or an inert gas in the above-described range, it is possible to uniformly generate tellurium nanoparticles and antibacterial metal nanoparticles in the desired amount.

The channel part (130) is a part in which doping is performed between nanoparticles generated in the discharge part (120). Specifically, the discharge part (120) is located within the channel part (130), and more specifically, the gap between the first electrode (111) and the plurality of second electrodes is located within the channel part (130). That is, in the channel part (130), tellurium nanoparticles and antibacterial metal nanoparticles are generated from the first electrode (111) and the plurality of second electrodes, and the doping is performed between the tellurium nanoparticles and antibacterial metal nanoparticles generated in the above. The doping may be performed by electrostatic attraction between the nanoparticles, as the tellurium nanoparticles represent cathodes and the antibacterial metal nanoparticles represent anodes. By generating spark discharge using the first electrode (111) and a plurality of second electrodes and performing the doping between the tellurium nanoparticles and the antibacterial metal nanoparticles in a plasma state by the spark discharge, thereby having different crystal structures from the respective inherent nanoparticle crystals, the nanocomposite preparation apparatus of the present application may prepare nanoparticles whose properties have changed. As a result, the nanocomposite preparation apparatus of the present application may prepare a nanocomposite having excellent stability by reducing toxicity while maintaining the inherent antibacterial properties of the antibacterial metals.

The nanocomposite preparation apparatus of the present application may further comprise a collection part (not shown). The collection part is a part for collecting the doped nanocomposite. The collection part may be disposed at the bottom of the discharge part. Specifically, the nanocomposite doped in the channel part may be collected to the collection part using the electrostatic attraction. More specifically, the doped nanocomposite has a large content of tellurium as a main component to represent the cathode, whereby it may be collected by inducing positive charges in the collection part and then using an object having negative potentials. In one embodiment, a pin-to-ring corona charger may be used as a device for inducing positive charges, and a metal rod polished to represent negative potentials may be used as the object having negative potentials, without being limited thereto.

The present application also relates to a nanocomposite. For example, the nanocomposite relates to a nanocomposite prepared by the above-described nanocomposite preparation apparatus. Therefore, the contents described in the nanocomposite preparation apparatus may be equally applied to the details of the nanocomposite.

The nanocomposite is prepared by the nanocomposite preparation apparatus, whereby it may have excellent stability by reducing toxicity while maintaining antibacterial properties of conventional antibacterial metals.

FIG. 2 exemplarily shows a nanocomposite prepared by the nanocomposite preparation apparatus according to one example of the present application. As shown in FIG. 2, the nanocomposite (200) doped in the channel part may have a form in which the antibacterial metal nanoparticles (220) are inserted into the tellurium nanoparticles (210).

The nanocomposite (200) may comprise an antibacterial metal (220) in an amount of 0.1 parts by weight to 20 parts by weight relative to 100 parts by weight of tellurium (210). Specifically, the nanocomposite (200) may comprise an antibacterial metal (220) in an amount of 1 part by weight to 15 parts by weight, 3 parts by weight to 10 parts by weight, or 5 parts by weight to 8 parts by weight relative to 100 parts by weight of tellurium (210). As the nanocomposite satisfies the above-described composition ratio, it may have excellent stability by reducing toxicity while maintaining the inherent antibacterial properties of the antibacterial metals.

The geometric mean diameter of the nanocomposite (200) may be less than 200 nm. Specifically, the geometric mean diameter of the nanocomposite (200) may be less than 195 nm or less than 190 nm, and the lower limit of the geometric mean diameter of the nanocomposite (200) may be 100 nm or more, 110 nm or more, or 120 nm or more. As the nanocomposite (200) satisfies the geometric mean diameter in the above-described range, the antibacterial metal nanoparticles (220) are well doped in the tellurium nanoparticles (210), whereby it may have a geometric mean diameter similar to that of the tellurium nanoparticles (210) included as a main component.

In one example, the nanocomposite (200) may have a cell survival rate of more than 60% as measured for HDF cells in an amount of 200 μg/mL for 24 hours using 3-(4,5-dimethylthiazol-2-yl)-2,5-diphenyltetrazolium bromide (MTT) analyses. Specifically, the cell survival rate of the nanocomposite (200) measured under the above conditions may be 61% or more, or 62% or more, and the upper limit of the cell survival rate of the nanocomposite (200) measured under the above conditions may be 63% or less. As the nanocomposite (200) exhibits the cell survival rate in the above-described range under the above-described conditions, it may have excellent stability by reducing toxicity while maintaining the inherent antibacterial properties of the antibacterial metals.

Advantageous Effects

The nanocomposite preparation apparatus of the present application can prepare a nanocomposite having excellent stability by reducing toxicity while maintaining antibacterial properties of conventional antibacterial metals.

DESCRIPTION OF DRAWINGS

FIG. 1 is a diagram illustratively showing a nanocomposite preparation apparatus according to one example of the present application.

FIG. 2 is a diagram illustratively showing a nanocomposite prepared by a nanocomposite preparation apparatus according to one example of the present application.

FIG. 3 is graphs showing size distributions of Ag—Te nanocomposites prepared in Examples 1 to 3 using a scanning mobility particle sizer (SMPS).

FIG. 4 is graphs showing size distributions of Ag—Te nanocomposites prepared in Examples 4 to 6 using a scanning mobility particle sizer (SMPS).

FIG. 5 is a graph showing the size distribution of Te nanoparticles prepared in Comparative Example 3.

FIG. 6 is graphs showing size distributions that Ag—Te nanocomposites prepared in Examples 1 to 3. Cu—Te nanocomposites prepared in Examples 4 to 6, and Te nanoparticles prepared in Comparative Example 3 are measured in phosphate buffered saline (PBS) using a dynamic light scattering (DLS) analysis.

FIG. 7 is images showing elemental analyses of an Ag—Te nanocomposite prepared by the nanocomposite preparation apparatus of Example 2 using only two silver anodes and a Cu—Te nanocomposite prepared by the nanocomposite preparation apparatus of Example 5 using only two copper anodes.

FIG. 8 is high and low magnification scanning electron microscope (TEM) images of an Ag—Te nanocomposite, a Cu—Te nanocomposite, Te nanoparticles, Ag nanoparticles, and Cu nanoparticles in the preparation processes by the nanocomposite preparation apparatuses of Examples 1 and 4, respectively.

FIG. 9 is graphs showing the microstructure and light absorption characteristics of the Ag—Te nanocomposite prepared by the nanocomposite preparation apparatus of Example 2.

FIG. 10 is graphs showing the microstructure and light absorption characteristics of the Cu—Te nanocomposite prepared by the nanocomposite preparation apparatus of Example 4.

FIG. 11 is graphs showing antibacterial efficiencies of Ag—Te nanocomposites prepared in Examples 1 to 3, Cu—Te nanocomposites prepared in Examples 4 to 6, Ag nanoparticles prepared in Comparative Example 1, Cu nanoparticles prepared in Comparative Example 2 and Te nanoparticles prepared in Comparative Example 3.

FIG. 12 is graphs showing minimum inhibitory concentrations of Ag—Te nanocomposites prepared in Examples 1 to 3, Cu—Te nanocomposites prepared in Examples 4 to 6. Ag nanoparticles prepared in Comparative Example 1, Cu nanoparticles prepared in Comparative Example 2 and Te nanoparticles prepared in Comparative Example 3 for *E. coli* (gram-negative) and *S. epidermidis* (gram-positive), and the illustrations of FIG. 12 are confocal laser scanning microscope (CLSM) images showing survival of *E. coli* and *S. epidermidis* untreated or treated with 30 μg/mL of Te nanoparticles prepared in Comparative Example 3.

FIG. 13 is images of cell viability between the Ag—Te nanocomposite prepared in Example 2 (middle) or the Cu—Te nanocomposite prepared in Example 5 (right) and living *E. coli* (left) as evaluated with high magnification and low magnification scanning electron microscopes (SEM) (top) and a confocal laser scanning microscope (CLSM) (bottom), which are images comparing bacterial morphology.

FIG. 14 is images of cell viability between the Ag—Te nanocomposite prepared in Example 2 (middle) or the Cu—Te nanocomposite prepared in Example 5 (right) and living *S. epidermidis* (left) as evaluated with high magnification and low magnification scanning electron microscopes (SEM) (top) and a confocal laser scanning microscope (CLSM) (bottom), which are images comparing bacterial morphology.

FIG. 15 is graphs showing cell survival rates measured using 3-(4,5-dimethylthiazol-2-yl)-2,5-diphenyltetrazolium bromide (MTT) analyses after treating HDF cells with Ag—Te and Cu—Te nanocomposites prepared by the respective nanocomposite preparation apparatuses of Examples 1 and 4, and Te, Ag and Cu nanoparticles prepared by the respective nanoparticle preparation apparatuses of Comparative Examples 1, 2 and 3 at each concentration of 5 μg/mL to 200 μg/mL for 24 hours.

FIG. 16 is graphs showing cell survival rates measured using 3-(4,5-dimethylthiazol-2-yl)-2,5-diphenyltetrazolium bromide (MIT) analyses after treating HDF cells with Ag—Te and Cu—Te nanocomposites prepared by the respective nanocomposite preparation apparatuses of Examples 1 and 4, and Te, Ag and Cu nanoparticles prepared by the respective nanoparticle preparation apparatuses of Comparative Examples 1, 2 and 3 at each concentration of 5 μg/mL to 200 μg/mL for 48 hours.

FIG. 17 is graphs showing cell survival rates measured using 3-(4,5-dimethylthiazol-2-yl)-2,5-diphenyltetrazolium bromide (MTT) analyses after treating HDF cells with Ag—Te nanocomposites prepared by the nanocomposite preparation apparatuses of Examples 1 to 3, and Cu—Te nanocomposites prepared by the nanoparticle preparation apparatuses of Examples 4 to 6 at each concentration of 5 μg/mL to 200 μg/mL for 24 hours.

FIG. 18 is graphs showing cell survival rates measured using 3-(4,5-dimethylthiazol-2-yl)-2,5-diphenyltetrazolium bromide (MTT) analyses after treating HDF cells with Ag—Te nanocomposites prepared by the nanocomposite preparation apparatuses of Examples 1 to 3, and Cu—Te nanocomposites prepared by the nanoparticle preparation apparatuses of Examples 4 to 6 at each concentration of 5 μg/mL to 200 μg/mL for 48 hours.

FIG. 19 is graphs showing generation of reactive oxygen species after treating HDF cells for 24 hours with Ag—Te nanocomposites prepared by the nanocomposite preparation apparatuses of Examples 1 to 3.

FIG. 20 is graphs showing generation of reactive oxygen species after treating HDF cells for 24 hours with Cu—Te nanocomposites prepared by the nanocomposite preparation apparatuses of Examples 4 to 6.

FIG. 21 is graphs showing hemolysis rates of red blood cells after treatment with 50 μg/mL of Ag—Te and Cu—Te nanocomposites prepared by the respective nanocomposite preparation apparatuses of Examples 1 to 6 at 37° C. for 30 minutes.

FIGS. 22 and 23 are graphs showing safety index (SI) values and safety index (SI) ranges from evaluation of antimicrobial activity (MIC) and biocompatibility ($PC_{90}$) of Ag—Te nanocomposites prepared by the nanocomposite preparation apparatuses of Examples 1 to 3 and Cu—Te nanocomposites prepared by the nanocomposite preparation apparatuses of Examples 4 to 6, and Te, Ag and Cu nanoparticles prepared by the respective nanoparticle preparation apparatuses of Comparative Examples 1 to 3 for *E. coli* and *S. epidermidis*, respectively.

BEST MODE

Hereinafter, the above-described contents will be described in more detail through Examples and Comparative Examples, but the scope of the present application is not limited by the contents presented below.

Example 1

Preparation of Ag—Te Nanocomposite

A nanocomposite was prepared using the apparatus of FIG. 1. Specifically, a tellurium cathode (TE-E-035M-R, American Elements, USA) having a diameter of 6 mm as a first electrode, a 2-1 electrode and a 2-2 electrode, and a silver anode (AG-402561, Nilaco, Japan) having a diameter of 3 mm as a 2-3 electrode were installed inside a chamber having a volume of 8 cm$^3$, and an alternating-current power source was electrically connected to each of the first electrode, the 2-1 electrode, the 2-2 electrode and the 2-3 electrode. At this time, the alternating-current power source was controlled to a voltage of 2 kV and a frequency of 2.5 kHz. The length of the gap facing between the first electrode and the 2-2 electrode and between the 2-1 electrode and the 2-3 electrode was maintained at 1 mm. A channel part was formed between the electrodes with a flow of 1.57 L/min of nitrogen (99.9999% purity) at room temperature. Thereafter, the high temperature generated by spark discharge in the channel part induced partial evaporation of each electrode. The resulting vapors of tellurium and silver nanoparticles were continuously condensed through a temperature gradient to prepare a solid Ag—Te nanocomposite. At this time, the content of silver (Ag) in the condensed nanocomposite was formed to be 5.4 parts by weight relative to 100 parts by weight of tellurium nanoparticles. The content of the silver nanoparticles was sufficient to maintain an appropriate safety index (SI) value in antibacterial and cytotoxic evaluation.

Thereafter, in order to directly collect the Ag—Te nanocomposite, a pin-to-ring type corona charger (+1.6 kV/cm) was installed at the bottom of a discharge part. The corona charger was used to induce positive charges of the nanocomposite.

Then, the above-charged nanocomposite was collected as a powder on a stainless-steel rod polished to have a negative potential of −0.8 kV/cm. Subsequently, the collection rod was inserted into a vial containing buffered saline, the vial was immersed in an ultrasonic bath for 10 minutes, and the particles were suspended in the saline to obtain an Ag—Te nanocomposite.

Example 2

Preparation of Ag—Te Nanocomposite

An Ag—Te nanocomposite was obtained in the same manner as in Example 1, except that the 2-2 electrode was changed to a silver anode (AG-402561, Nilaco, Japan) having a diameter of 3 mm, the vapor of silver nanoparticles was generated from the 2-2 electrode and the 2-3 electrode by spark discharge and the content of the silver nanoparticles was changed to 6.8 parts by weight relative to 100 parts by weight of the tellurium nanoparticles to prepare a nanocomposite.

Example 3

Preparation of Ag—Te Nanocomposite

An Ag—Te nanocomposite was obtained in the same manner as in Example 1, except that the 2-1 electrode and the 2-2 electrode were changed to a silver anode (AG-402561, Nilaco, Japan) having a diameter of 3 mm, the vapor of silver nanoparticles was generated from the 2-1 electrode, the 2-2 electrode and the 2-3 electrode by spark discharge and the content of the silver nanoparticles was changed to 8.0 parts by weight relative to 100 parts by weight of the tellurium nanoparticles to prepare a nanocomposite.

Example 4

Preparation of Cu—Te Nanocomposite

A Cu—Te nanocomposite was obtained in the same manner as in Example 1, except that the 2-3 electrode was changed to a copper anode (CU-112564, Nilaco, Japan) having a diameter of 3 mm, the vapor of copper nanoparticles was generated from the 2-3 electrode by spark discharge and the content of the copper nanoparticles was changed to 6.1 parts by weight relative to 100 parts by weight of the tellurium nanoparticles to prepare a nanocomposite.

Example 5

Preparation of Cu—Te Nanocomposite

A Cu—Te nanocomposite was obtained in the same manner as in Example 1, except that the 2-2 electrode and the 2-3 electrode were changed to a copper anode (CU-112564, Nilaco, Japan) having a diameter of 3 mm, the vapor of copper nanoparticles was generated from the 2-2 electrode and the 2-3 electrode by spark discharge and the content of the copper nanoparticles was changed to 6.9 parts by weight relative to 100 parts by weight of the tellurium nanoparticles to prepare a nanocomposite.

Example 6

Preparation of Cu—Te Nanocomposite

A Cu—Te nanocomposite was obtained in the same manner as in Example 1, except that the 2-1 electrode, the 2-2 electrode and the 2-3 electrode were changed to a copper anode (CU-112564, Nilaco, Japan) having a diameter of 3 mm, the vapor of copper nanoparticles was generated from the 2-1 electrode, the 2-2 electrode and the 2-3 electrode by spark discharge and the content of the copper nanoparticles was changed to 7.7 parts by weight relative to 100 parts by weight of the tellurium nanoparticles to prepare a nanocomposite.

Comparative Example 1

Preparation of Ag Nanoparticles

A silver anode (AG-402561, Nilaco, Japan) having a diameter of 3 mm as a first electrode, a 2-1 electrode and a 2-2 electrode, a 2-3 electrode was installed inside a chamber having a volume of 8 cm³, and an alternating-current power source was electrically connected to each of the first electrode, the 2-1 electrode, the 2-2 electrode and the 2-3 electrode. At this time, the alternating-current power source was controlled to a voltage of 2 kV and a frequency of 2.5 kHz. The length of the gap facing between the first electrode and the 2-2 electrode and between the 2-1 electrode and the 2-3 electrode was maintained at 1 mm. A channel part was formed between the electrodes with a flow of 1.57 L/min of nitrogen (99.9999% purity) at room temperature. Thereafter, spark discharge was generated in the channel part to prepare Ag nanoparticles in a vapor state.

Comparative Example 2

Preparation of Cu Nanoparticles

Cu nanoparticles were obtained in the same manner as in Comparative Example 1, except that a copper anode (CU-112564, Nilaco, Japan) having a diameter of 3 mm was used as the first electrode, the 2-1 electrode, the 2-2 electrode and the 2-3 electrode, and Cu nanoparticles in a vapor state were prepared from the first electrode, the 2-1 electrode, the 2-2 electrode and the 2-3 electrode by spark discharge.

Comparative Example 3

Preparation of Te Nanoparticles

Te nanoparticles were obtained in the same manner as in Comparative Example 1, except that a tellurium cathode (TE-E-035M-R, American Elements, USA) having a diameter of 6 mm was used as the first electrode, the 2-1 electrode, the 2-2 electrode and the 2-3 electrode, and Te nanoparticles in a vapor state were prepared from the first electrode, the 2-1 electrode, the 2-2 electrode and the 2-3 electrode by spark discharge.

Comparative Example 4

Preparation of Ag—Te Nanocomposite

An Ag—Te nanocomposite was obtained in the same manner as in Example 1, except that a tellurium cathode (TE-E-035M-R, American Elements, USA) having a diameter of 6 mm was added as a 2-4 electrode, a 2-5 electrode, a 2-6 electrode and a 2-7 electrode, a tellurium cathode (TE-E-035M-R, American Elements, USA) having a diameter of 6 mm was used as the 2-1 electrode and the 2-2 electrode, the vapor of silver nanoparticles was generated from the 2-3 electrode by spark discharge and the content of the silver nanoparticles was changed to 0.086 parts by weight relative to 100 parts by weight of the tellurium nanoparticles to prepare a nanocomposite.

Comparative Example 5

Preparation of Ag—Te Nanocomposite

An Ag—Te nanocomposite was obtained in the same manner as in Example 1, except that a silver anode (AG-402561, Nilaco, Japan) having a diameter of 3 mm was added as a 2-4 electrode, a 2-5 electrode, a 2-6 electrode, a 2-7 electrode, a 2-8 electrode and a 2-9 electrode, a silver anode (AG-402561, Nilaco, Japan) having a diameter of 3 mm was used as the 2-1 electrode and the 2-2 electrode, the vapor of silver nanoparticles was generated from the 2-1 electrode, the 2-2 electrode, the 2-3 electrode, the 2-4 electrode, the 2-5 electrode, the 2-6 electrode, the 2-7 electrode, the 2-8 electrode and the 2-9 electrode by spark discharge and the content of the silver nanoparticles was changed to 21.6 parts by weight relative to 100 parts by weight of the tellurium nanoparticles to prepare a nanocomposite.

Comparative Example 6

Preparation of Cu—Te Nanocomposite

A Cu—Te nanocomposite was obtained in the same manner as in Example 1, except that a tellurium cathode (TE-E-035M-R, American Elements. USA) having a diameter of 6 mm was added as a 2-4 electrode, a 2-5 electrode, a 2-6 electrode and a 2-7 electrode, a tellurium cathode (TE-E-035M-R, American Elements, USA) having a diameter of 6 mm was used as the 2-1 electrode and the 2-2 electrode, a copper anode (CU-112564, Nilaco, Japan) having a diameter of 3 mm was used as the 2-3 electrode, the vapor of copper nanoparticles was generated from the 2-3 electrode by spark discharge and the content of the copper nanoparticles was changed to 0.086 parts by weight relative to 100 parts by weight of the tellurium nanoparticles to prepare a nanocomposite.

Comparative Example 7

Preparation of Cu—Te Nanocomposite

A Cu—Te nanocomposite was obtained in the same manner as in Example 1, except that a copper anode (CU-112564, Nilaco, Japan) having a diameter of 3 mm was added as a 2-4 electrode, a 2-5 electrode, a 2-6 electrode, a 2-7 electrode, a 2-8 electrode and a 2-9 electrode, a copper anode (CU-112564, Nilaco. Japan) having a diameter of 3 mm was used as the 2-1 electrode, the 2-2 electrode and the 2-3 electrode, the vapor of copper nanoparticles was generated from the 2-1 electrode, the 2-2 electrode, the 2-3 electrode, the 2-4 electrode, the 2-5 electrode, the 2-6 electrode, the 2-7 electrode, the 2-8 electrode and the 2-9 electrode by spark discharge and the content of the copper nanoparticles was changed to 21.6 parts by weight relative to 100 parts by weight of the tellurium nanoparticles to prepare a nanocomposite.

Experimental Example 1. Characterization

1) Size Distribution
(1) Experiment Method

The size distributions of the Ag—Te nanocomposite, Cu—Te nanocomposite and Te nanoparticles of each of Examples and Comparative Examples in gas and liquid states were measured using a scanning mobility particle sizer (3936, TSI, USA) and a dynamic light scattering (Nano-ZS, Malvern Instruments, UK) system, respectively. The scanning mobility particle sizer (SMPS) measurement was performed by directly sampling 0.3 L/min of gas containing the nanocomposite and nanoparticles prepared in the nanocomposite preparation apparatus and the nanoparticle preparation apparatus of each of Examples and Comparative Examples, respectively. The dynamic light scattering (DLS) evaluation was performed by collecting the nanocomposites and nanoparticles prepared in Examples and Comparative Examples above for 30 minutes in a collection rod and then suspending them in buffered saline.

(2) Experiment Results

FIG. 3 shows size distributions of Ag—Te nanocomposites prepared in Examples 1 to 3 using a scanning mobility particle sizer (SMPS). Also, FIG. 4 shows size distributions of Ag—Te nanocomposites prepared in Examples 4 to 6 using a scanning mobility particle sizer (SMPS). Furthermore, FIG. 5 shows the size distribution of Te nanoparticles prepared in Comparative Example 3. The geometric mean diameter (GMD) of the Ag—Te nanocomposites prepared in Examples 1 to 3 and the Cu—Te nanocomposites prepared in Examples 4 to 6 was less than 200 nm, the geometric standard deviation was 1.59 to 1.65, and the total number concentration was $1.5 \text{ Y } 10^7$ particles/$cm^3$ to $2.1 \text{ Y } 10^7$ particles/$cm^3$. When compared with the Te nanoparticles prepared in Comparative Example 3, the Ag—Te nanocomposites prepared in Examples 1 to 3 and the Cu—Te nanocomposites prepared in Examples 4 to 6 did not significantly change the single mode distribution of Te alone. That is, the fact of representing the similar size distributions among the Te nanoparticles prepared in Comparative Example 3, and the Ag—Te nanocomposites prepared in Examples 1 to 3 and the Cu—Te nanocomposites prepared in Examples 4 to 6 each doped with Ag or Cu indicated that Te was the main component by the characteristics of the spark discharge. In order to reduce toxicity by adjusting the content of Ag or Cu with higher toxicity than Te, these spark discharge conditions were designed to induce an imbalance of Te and Ag or Cu contents. This control was achieved using the difference in vaporization heat among Te (52.55 kJ/mol). Ag (250.58 kJ/mol) and Cu (300.30 kJ/mol). Since the Ag or Cu was completely inserted into the Te due to the electrostatic phenomenon between the vapors of the Te nanoparticles and the Ag or Cu nanoparticles and the accidental coincidence of + charges and − charges during the processes, there was no difference in size distribution between the nanocomposites prepared using 1 to 3 Ag or Cu anodes.

FIG. 6 shows size distributions that Ag—Te nanocomposites prepared in Examples 1 to 3, Cu—Te nanocomposites prepared in Examples 4 to 6, and Te nanoparticles prepared in Comparative Example 3 are measured in phosphate buffered saline (PBS) using a dynamic light scattering (DLS) analysis. The higher the concentration of the nanocomposite after 30 minutes collection in PBS 2 mL than the SMPS measurement, the more the size distributions varied, but the size range of the Ag—Te nanocomposite prepared in Examples 1 to 3 and the Cu—Te nanocomposite prepared in Examples 4 to 6 was not significantly different from the size of the Te nanoparticles prepared in Comparative Example 3. That is, it was shown that Te remained as the main component even in the absence of a stabilizer. To confirm the superiority of Te, a mapping microanalysis was performed using a scanning electron microscope-energy dispersive X-ray (SEM-EDX, S-4800, Hitachi, Japan), whereby the contents of the atoms, Ag and Cu, in the nanocomposite were measured.

FIG. 7 shows elemental analyses of an Ag—Te nanocomposite prepared by the nanocomposite preparation apparatus of Example 2 using only two silver anodes and a Cu—Te nanocomposite prepared by the nanocomposite preparation apparatus of Example 5 using only two copper anodes. As shown in FIG. 7, the Gg and Cu contents of the Ag—Te nanocomposite of Example 2 and the Cu—Te nanocomposite of Example 5 were found to be 6.8% and 6.9% of the Te content, respectively. Also, in the Ag—Te nanocomposites of Examples 1 and 3, in which only one and three silver anodes were each used to prepare a nanocomposite, the Ag contents were found to be 5.4% and 8.0% of the Te content, respectively. Furthermore, in the Cu—Te nanocomposites of Examples 4 and 6, in which only one and three copper anodes were each used to prepare a nanocomposite, the Cu contents were found to be 6.1% and 7.7% of the Te content, respectively.

2) Morphology (1) Experiment Method

In order to analyze the shape and microstructure of the nanocomposite, a carbon-coated copper grid (Tedpella, USA) was placed in the holder of a grid sampler (Ineris, France), and gas flows containing the nanocomposites and nanoparticles prepared in the nanocomposite preparation apparatus and nanoparticle preparation apparatus of each of Examples and Comparative Examples, respectively, were directly injected into the sampler, whereby the nanocomposites and nanoparticles were directly deposited on the grid surface. Then, the grid was transferred to a holder for transmission electron microscope (TEM, Tecnai G2 F20 S-TWIN, FEI, USA) analyses. The grid in which the particles were collected was transferred to a holder for mapping analyses of SEM-EDX (S-4800, Hitachi, Japan) to observe the particle shape and elemental composition.

(2) Experiment Results

FIG. 8 shows high and low magnification scanning electron microscope (TEM) images of an Ag—Te nanocomposite, a Cu—Te nanocomposite, Te nanoparticles, Ag nanoparticles, and Cu nanoparticles in the preparation processes by the nanocomposite preparation apparatuses of Examples 1 and 4, respectively. As shown in FIG. 8, when spark discharge was generated using the nanocomposite preparation apparatus, the size of the particles differed by reflecting the difference in metal vaporization and condensation (Te: 24±6.6 nm, Ag: 4.4±1.3 nm, Cu: 4.2±0.9 nm), but primarily, spherical Te, Ag and Cu nanoparticles were produced. The high magnification TEM image of Te showed a d-spacing of 0.590 nm indicating the formation of a (001) hexagonal Te plane, and it was confirmed that the spark discharge generated crystalline Te particles. Characteristically, the d-spacing values of Ag and Cu particles are 0.234 nm and 0.213 nm, respectively, which show the formation of a Miller (12) plane in face-centered cubic Ag and Cu. However, Ag and Cu doping in the presence of two Ag or Cu anodes leads to the formation of another type of composite that is distinct from one produced in the presence of 1 or 3 anodes. In particular, the microstructures of the Ag—Te and Cu—Te nanocomposites include (001) hexagonal Te planes having d-spacings of 0.374 nm and 0.367 nm, respectively. These results correspond to the (12)-induced monoclinic $Ag_2Te$ and (002)-induced hexagonal $Cu_2Te$ phases, respectively, which indicate that the co-condensation induces the formation of strong bonding and partial alloy of Ag and Cu ions to Te. Therefore, the partial doping affects Te crystal growth during the process using the nanocomposite preparation apparatus of Examples, which induces a different type of composite as compared to the Te nanoparticles prepared using the nanoparticle preparation apparatus of Comparative Example 3, and indicates that the spark discharge can be used to accurately produce partially doped nanocomposites in a plug-and-play manner.

3) Surface and Optical Characteristics (1) Experiment Method

The surface structures of Ag—Te and Cu—Te nanocomposites were evaluated using XPS (Axis-HIS, Kratos Analytical, Japan), and the results were compared with the surface structures of pure Te, Ag and Cu particles. The light absorption spectrum of the Ag—Te or Cu—Te nanocomposite in buffered saline was measured in a wavelength range of 300 nm to 1200 nm using a UV-vis spectrophotometer (T60, PG Instruments, UK).

(2) Experiment Results

FIGS. 9 and 10 show the microstructures and light absorption characteristics of the nanocomposites prepared by the nanocomposite preparation apparatuses of Examples 2 and 4. As shown in FIG. 9, the valence states of Ag—Te and Cu—Te nanocomposites having doublet shifts in Te3d, Cu2p, and Ag3d core spectra were consistent with the partial alloys of $Ag_2Te$ and $Cu_2Te$, as compared with the doublets of Te and standard Ag and Cu nanoparticles. In addition, as a result of analyzing X-ray photoelectron spectroscopic analysis (XPS, Axis-HIS, Kratos Analytical, Japan) peaks, in the nanocomposites prepared using 1 to 3 Ag or Cu anodes, respectively, the contents of Ag and Cu nanoparticles were found to be 5.3% and 5.9%, 6.5% and 6.6%, and 8.0% and 7.8% of Te nanoparticles, respectively. These data indicate that precise modulation of the spark discharge can be used to achieve the contents of Ag and Cu nanoparticles in the desired range (5% to 8%).

Furthermore, as shown in FIG. 10, in UV-vis spectrophotometer (T60, PG Instruments, UK) characteristic comparison of the Ag—Te and Cu—Te nanocomposites, the constitution doped with Ag and Cu did not show Te characteristic absorption at 350 nm, and further showed crystalline modification of Te. In addition, since the Ag—Te and Cu—Te nanocomposites hardly absorb visible light (390-700 nm), it was shown that the nanocomposites prepared above could be suitable for a transparent antibacterial coating. In the zeta potential analysis of the phosphate buffered saline solution at pH 7.4, as shown in FIG. 10, the dispersion images of the Ag—Te nanocomposite, Cu—Te nanocomposite and Te nanoparticles did not show a significant change in the zeta potential or the dispersion color after partial doping with Ag and Cu.

Experimental Example 2. Bioanalysis

1) Antibacterial Efficiency (1) Experiment Method

For *E. coli* (ATCC-11775) and *S. epidermidis* (ATCC-14990), the antibacterial activity of the nanocomposites prepared in Examples and the nanoparticles prepared in Comparative Examples was evaluated using a colony counting method. That is, the bacterial culture was diluted to $10^5$ CFU/mL by measuring the optical density at 620 nm using a UV-vis spectrophotometer. Subsequently, 100 μL of the suspension of the nanocomposite and nanoparticles was added to 2 mL of the bacterial solution and mixed in an incubator at 37° C. for 24 hours. Thereafter, the cultured solution was diluted with deionized water and made to have a concentration suitable for colony counting. The solution was sprinkled on an agar plate and continuously incubated at 37° C. for 24 hours. The antibacterial efficiency of the particles was calculated using the following general formula 1.

$$\eta_{antimicrobial} = 1 - \frac{CFU_{treated}}{CFU_{untreated}} \quad \text{[General Formula 1]}$$

Here, $CFU_{treated}$ and $CFU_{untreated}$ are CFU results in the treated configuration and the untreated configuration, respectively.

In order to identify the antibacterial activity, the bacteria ($10^5$ CFU/mL) were cultured with a tryptic soy broth (TSB) medium containing 30 μg/mL of the nanocomposite and nanoparticles at 37° C. for 1 hour. The treated bacteria were washed, and then resuspended in deionized water, and fixed on a silicon wafer (Tedpella, USA) with 5 μL of liquid droplets. The sample was dried with ambient air, coated with thin platinum, and then placed in a SEM (JSM-7800F, JEOL, Japan) analyzer holder. The bacteria treated by 30 μg/mL of the nanocomposite were incubated at 37° C. for 1 hour with gentle rotation, and stained using alive or dead BacLight bacterial viability kits (L7012, Invitrogen, USA). Alive bacteria were indicated by green fluorescence, and visualized using CLSM (LSM 880, Carl Zeiss, Germany) to identify antibacterial activity of the nanocomposite and nanoparticles.

(2) Experiment Results

As shown in FIG. 11, the Ag nanoparticles prepared by the nanoparticle preparation apparatus of Comparative Example 1 and the Cu nanoparticles prepared by the nanoparticle preparation apparatus of Comparative Example 2 showed an antibacterial efficiency of more than 99.9% against both *E. coli* and *S. epidermidis*, and the Te nanoparticles prepared by the nanoparticle preparation apparatus of Comparative Example 3 showed an antibacterial efficiency of more than 80% against *E. coli*, and the antibacterial efficiency was inactive against epidermal bacteria. That is, it indicates that Te nanoparticles have insufficient efficacy against Gram-positive bacteria, and when they are used with Ag or Cu nanoparticles, it indicates that the activity against *S. epidermidis* is dramatically improved.

2) Minimum Inhibitory Concentration of Nanocomposites and Nanoparticles (1) Experiment Method The minimum inhibitory concentrations of the nanocomposites and nanoparticles prepared in Examples and Comparative Examples for bacteria were determined using a broth microdilution method. That is, the bacteria were inoculated into a 96-well disposable microtiter plate (SPL34096, SPL Life Sciences, Korea), and the suspended nanocomposite was diluted to the indicated concentration with 100 μL aliquots of tryptic soy broth (TSB) containing $10^5$ CFU/mL of bacteria. After incubation at 37° C. for 24 hours, the minimum inhibitory concentration of the nanocomposite was measured.

(2) Experiment Results

In order to quantitatively evaluate the antibacterial activity, the minimum inhibitory concentration of the nanocomposite was calculated and the results were shown in FIG. 12. In the case of both the nanocomposites and nanoparticles each prepared in Examples and Comparative Examples, the minimum inhibitory concentration was higher in *S. epidermidis* compared to *E. coli*, which is most likely to have reflected the resistance of the thicker, complex peptidoglycan layer. As identified in the confocal laser scanning microscope (CLSM. LSM 880, Carl Zeiss, Germany) analysis shown in the illustrations of FIG. 12, the minimum inhibitory concentration of Te nanoparticles for *S. epidermidis* was about 8,000 μg/mL, and the minimum inhibitory concentrations of the Ag and Cu nanoparticles were 62.50 μg/mL and 125.00 μg/mL, respectively. That is, it was shown that the minimum inhibitory concentration of the nanoparticles significantly improved the antibacterial activity of Te nanoparticles by the Ag and Cu doping, even in *S. epidermidis*. Also, the Ag—Te and Cu—Te nanocomposites have a lower minimum inhibitory concentration against *E. coli* than the Ag and Cu nanoparticles, and if they are doped with Ag or Cu, it indicates that they can greatly increase the antibacterial activity of Te after release of Ag or Cu ions impairing the membrane function. Furthermore, in the nanocomposite doped with Ag and Cu, the content control of Ag and Cu nanoparticles between 5% and 8% can maximize the activity of Te by preventing aggregation of Ag or Cu nanoparticles.

In order to identify the improvement of the antibacterial activity of Ag—Te nanocomposites and Cu—Te nanocomposites, the difference in cell morphology for each of *E. coli* and *S. epidermidis* between the untreated Ag—Te nanocomposite and Cu—Te nanocomposite, and the treated Ag—Te nanocomposite and Cu—Te nanocomposite was analyzed using the low magnification and high magnification scanning electron microscope (JSM-7800F. JEOL. Japan) images shown in FIGS. 13 and 14, respectively. As a result, the cell morphology of *E. coli* and *S. epidermidis* exhibited smooth oval and spherical distortion after treatment with the nanocomposite, and it was determined that the damaged membrane function was reflected.

High magnification scanning electron microscopy images indicate the presence of Ag—Te and Cu—Te nanocomposites around bacterial cells, which indicate that intimate contact between cells and nanocomposites induces irreversible cell damage and induces cell death. The confocal laser scanning microscopic images of the bacteria treated with the nanocomposite shown in FIGS. 13 and 14, respectively, did not show green fluorescence of alive cells.

3) Cell Survival Rate (1) Experiment Method

For HDF cells, using 3-(4,5-dimethylthiazol-2-yl)-2,5-diphenyltetrazolium bromide (MTT) analyses, the cytotoxicity of the Ag—Te nanocomposites, Cu—Te nanocomposites. Te nanoparticles, Ag nanoparticles, and Cu nanoparticles prepared by the nanocomposite preparation apparatus and the nanoparticle preparation apparatus of Examples and Comparative Examples, respectively, was evaluated after incubation for 24 hours and 48 hours, respectively. In a 96-well plate containing Dulbecco's modified Eagle medium (Hyclone. GE Healthcare Biosciences. USA) supplemented with 10% fetal bovine serum, 50 IU/mL of penicillin and 50 μg/mL of streptomycin, $10^4$ cell/well of cells were seeded and maintained in a humidified chamber containing 5% $CO_2$ at 37° C. for 12 hours. After exposing the nanocomposites and nanoparticles, the attached cells were washed and incubated with 100 μL of MTT reagent (1.25 mg mL-1) in a dark place for 4 hours. Thereafter, the generated formazan crystals were dissolved in 100 μl of dimethyl sulfoxide, and absorbance was recorded at 570 nm using a microplate reader (Multiskan EX, Thermo Scientific, USA). Cell viability was calculated by the following general formula 2.

$$A_{sample}/A_{control} \times 100\% \quad \text{[General Formula 2]}$$

In Formula 2 above, A is absorbance at 570 nm.

(2) Experiment Results

FIG. 15 shows cell survival rates measured using 3-(4,5-dimethylthiazol-2-yl)-2,5-diphenyltetrazolium bromide (MTT) analyses after treating HDF cells with Ag—Te and Cu—Te nanocomposites prepared by the respective nanocomposite preparation apparatuses of Examples 1 and 4, and Te, Ag and Cu nanoparticles prepared by the respective nanoparticle preparation apparatuses of Comparative Examples 1, 2 and 3 at each concentration of 5 μg/mL to 200 μg/mL for 24 hours. In addition, FIG. 16 shows cell survival rates measured using 3-(4,5-dimethylthiazol-2-yl)-2,5-diphenyltetrazolium bromide (MTT) analyses after treating HDF cells with Ag—Te and Cu—Te nanocomposites prepared by the respective nanocomposite preparation apparatuses of Examples 1 and 4, and Te, Ag and Cu nanoparticles prepared by the respective nanoparticle preparation apparatuses of Comparative Examples 1, 2 and 3 at each concentration of 5 μg/mL to 200 μg/mL for 48 hours.

The Ag nanoparticles and Cu nanoparticles showed toxicity to HDF cells, and the cell survival rates for the treatment for 48 hours were 70.3% and 47.3%, respectively, which was found to reflect the generation of free radicals and reactive oxygen species. On the contrary, when treated with Ag—Te nanocomposite for 24 hours and 48 hours, both showed negligible levels of toxicity, and the Ag—Te nanocomposite showed a similar level of toxicity to Te particles, and thus it was confirmed that the release of the Ag ions from Ag2Te could be sustained or controlled. However, the Cu—Te nanocomposite was more toxic than the Ag nanoparticles, which indicated to be potentially due to the detrimental effect of the reactive oxygen species generation mediated by Cu. Therefore, as shown in FIGS. 17 and 18, it could be seen that the toxicity of the Cu—Te nanocomposite increased with the Cu content.

4) Reactive Oxygen Species (ROS) Analyses (1) Experiment Method

HDF cells were treated with the nanocomposites prepared by the nanocomposite preparation apparatus of Examples 1 to 6 at 50 μg/mL for the indicated time. Then, using 2',7'-dichlorodihydrofluorescein diacetate analyses (ab113851, Abcam, UK), the cellular reactive oxygen species generation was analyzed by a flow cytometer (BD Biosciences, USA).

(2) Experiment Results

FIG. 19 shows generation of reactive oxygen species after treating HDF cells for 24 hours with Ag—Te nanocomposites prepared by the nanocomposite preparation apparatuses of Examples 1 to 3. In addition, FIG. 20 shows generation of reactive oxygen species after treating HDF cells for 24 hours with Cu—Te nanocomposites prepared by the nanocomposite preparation apparatuses of Examples 4 to 6. As shown in FIGS. 19 and 20, the treatment with Cu—Te nanoparticles for 24 hours resulted in generation of more active oxygen species than the case of treatment with 50 μg/mL of Ag—Te nanoparticles. While a small amount of reactive oxygen species activates cellular defense mechanisms, it can promote oxidative stress in high levels and can irreversibly damage lipids, proteins and DNA. Thus, reactive oxygen species and cell survival rates indicate that the later conditions dominate in the presence of the Cu—Te nanocomposite.

5) Hemolysis (1) Experiment Method

Blood samples were injected into male Sprague-Dawley rats and centrifuged, and then red blood cells were resuspended in saline (10 Y). The red blood cell suspension was dispersed in normal saline or 0.025% Triton X-100 to obtain negative and positive controls, respectively. Subsequently, the nanocomposite sample was added to the red blood cell suspension at 50 μL/mL, incubated at 37±1° C. for 30 minutes, and then centrifuged at 4000 rpm for 10 minutes. Thereafter, the absorbance value of the supernatant was recorded at 540 nm using a microplate spectrophotometer (Multiskan EX, Thermo Scientific, USA) and the hemolysis rate was calculated.

(2) Experiment Results

FIG. 21 shows hemolysis rates of red blood cells after treatment with 50 μg/mL of Ag—Te and Cu—Te nanocomposites prepared by the respective nanocomposite preparation apparatuses of Examples 1 to 6 at 37° C. for 30 minutes. The illustration of FIG. 21 is an image showing hemoglobin in the red blood cell supernatant after treatment with the nanocomposite. The respective numbers represented the negative control, the positive control, the Ag—Te nanocomposite of Example 1, the Ag—Te nanocomposite of Example 2, the Ag—Te nanocomposite of Example 3, the Cu—Te nanocomposite of Example 4, the Cu—Te nanocomposite of Example 5 and the Cu—Te nanocomposite of Example 6 in order. As shown in FIG. 21, from the hemolysis analysis results of the defibrinated blood after treatment with the nanocomposites for 30 minutes, the Cu—Te nanocomposite showed better hemolysis than that of the Ag—Te nanocomposite, which represented hemolysis of 76% at 50 ml/mL ($p<0.001$). The Ag—Te nanocomposite induced hemolysis of less than 9% at the same concentration, indicating that it could be used as a safe drug as an antibacterial agent. In addition, this toxicity analysis indicated that 6% of Ag nanoparticles in Te nanoparticles provided safe antibacterial activity with biocompatibility at all minimum inhibitory concentrations against both *E. coli* and *S. epidermidis*.

6) Statistical Analyses (1) Experiment Method

Data were presented as mean±standard deviation. Differences between treatment groups were confirmed using Student's t-test and unilateral variance analyses, which were regarded as having significance when $p<0.05$.

(2) Experiment Results

In order to identify the effectiveness of the Ag—Te nanocomposite and the Cu—Te nanocomposite, the corresponding safety index (SI) was estimated using the following general formula 3.

$$SI = \frac{PC_{90}}{MIC} \quad \text{[General Formula 3]}$$

In General Formula 3 above, $PC_{90}$ is the concentration (μg/mL) of the nanocomposite showing a cell survival rate of more than 90% in the MTT analyses.

FIGS. 22 and 23 show safety index (SI) values and safety index (SI) ranges from evaluation of antimicrobial activity (MIC) and biocompatibility ($PC_{90}$) of Ag—Te nanocomposites prepared by the nanocomposite preparation apparatuses of Examples 1 to 3 and Cu—Te nanocomposites prepared by the nanocomposite preparation apparatuses of Examples 4 to 6, and Te, Ag and Cu nanoparticles prepared by the respective nanoparticle preparation apparatuses of Comparative Examples 1 to 3 for *E. coli* and *S. epidermidis*, respectively. As shown in FIG. 22, the evaluated safety index (SI) was constructed for the number of working anodes (Ag or Cu), and the x(MIC)-y(PC90) plot was created to indicate the concentration range of the antibacterial agent considering safety against *E. coli* and *S. epidermidis*.

In FIGS. 22 and 23, the data of the upper drawing indicated that the higher safety index (SI) complied with the safety design principles, while in the upper right of the quadrants of the lower drawing, it was shown that the lower the safety index (SI), the better safety was provided in antibacterial application fields. This plot indicates that about 6% of Ag nanoparticles provide a suitable platform for identifying optimal antibacterial agents for safe and practical use.

EXPLANATION OF REFERENCE NUMERALS

111: first electrode
112: 2-1 electrode
113: 2-2 electrode
114: 2-3 electrode
120: discharge part
130: channel part
140: power supply part
200: nanocomposite
210: tellurium nanoparticles
220: antibacterial metal nanoparticles

The invention claimed is:

1. A nanocomposite preparation apparatus comprising an electrode part including a first electrode made of tellurium and a plurality of second electrodes made of tellurium or an antibacterial metal;
   a power supply part for applying a power source to each of the first electrode and the plurality of second electrodes;
   a discharge part for generating, using a spark discharge, tellurium nanoparticles having a negative polarity and antibacterial metal nanoparticles having a positive polarity from a gap between the first electrode and the plurality of second electrodes; and
   a channel part in which doping is performed by electrostatic attraction between the tellurium nanoparticles having the negative polarity and the antibacterial metal nanoparticles having the positive polarity,
   wherein the plurality of second electrodes consists of 2 to 6 electrodes, and
   wherein at least one of the plurality of second electrodes is made of the antibacterial metal.

2. The nanocomposite preparation apparatus according to claim 1, wherein a minimum distance (dmin) between adjacent electrodes among the first electrode and the plurality of second electrodes is 0.1 mm to 10.0 mm.

3. The nanocomposite preparation apparatus according to claim 1, wherein the antibacterial metal is silver, copper, gold, magnesium, zinc or titanium.

4. The nanocomposite preparation apparatus according to claim 1, wherein the power supply part is controlled to a voltage of 0.5 kV to 20 kV and a frequency of 0.2 kHz to 20 KHz.

5. The nanocomposite preparation apparatus according to claim 1, wherein spark discharge is performed under a flow of nitrogen or an inert gas.

* * * * *